RANDOM ACCESS STRIP STORAGE SYSTEM

Filed June 5, 1968

11 Sheets-Sheet 1

INVENTORS
CLEMENT H. KALTHOFF
LEO J. RIGBEY
BY Fraser and Bogucki
ATTORNEYS

RANDOM ACCESS STRIP STORAGE SYSTEM

INVENTORS
CLEMENT H. KALTHOFF
LEO J. RIGBEY
BY Fraser and Bogucki
ATTORNEYS

INVENTORS
CLEMENT H. KALTHOFF
LEO J. RIGBEY
BY Fraser and Bogucki
ATTORNEYS

April 7, 1970 C. H. KALTHOFF ET AL 3,504,824

RANDOM ACCESS STRIP STORAGE SYSTEM

Filed June 5, 1968 11 Sheets-Sheet 4

INVENTORS
CLEMENT H. KALTHOFF
LEO J. RIGBEY
BY Fraser and Bogucki
ATTORNEYS

RANDOM ACCESS STRIP STORAGE SYSTEM

Filed June 5, 1968 11 Sheets-Sheet 5

INVENTORS
CLEMENT H. KALTHOFF
LEO J. RIGBEY
BY Fraser and Bogucki
ATTORNEYS

INVENTORS
CLEMENT H. KALTHOFF
LEO J. RIGBEY
BY Fraser and Bogucki
ATTORNEYS

RANDOM ACCESS STRIP STORAGE SYSTEM

INVENTORS
CLEMENT H. KALTHOFF
LEO J. RIGBEY
BY
Fraser and Bogucki
ATTORNEYS

RANDOM ACCESS STRIP STORAGE SYSTEM

Filed June 5, 1968 11 Sheets-Sheet 8

RANDOM ACCESS STRIP STORAGE SYSTEM

Filed June 5, 1968 11 Sheets-Sheet 9

INVENTORS
CLEMENT H. KALTHOFF
LEO J. RIGBEY

BY *Fraser and Bogucki*

ATTORNEYS

RANDOM ACCESS STRIP STORAGE SYSTEM

Filed June 5, 1968 11 Sheets-Sheet 10

INVENTORS
CLEMENT H. KALTHOFF
LEO J. RIGBEY
BY
Fraser and Bogucki
ATTORNEYS

RANDOM ACCESS STRIP STORAGE SYSTEM

Filed June 5, 1968 11 Sheets-Sheet 11

INVENTORS
CLEMENT H. KALTHOFF
LEO J. RIGBEY
BY Fraser and Bogucki
ATTORNEYS 3,504,824

RANDOM ACCESS STRIP STORAGE SYSTEM

Clement H. Kalthoff, Boulder, Colo., and Leo J. Rigbey, Winchester, England, assignors to International Business Machines Corporation, Armonk, N.Y., a corporation of New York Filed June 5, 1968, Ser. No. 734,807
Int. Cl. G06f 1/00
U.S. Cl. 221—87 24 Claims

ABSTRACT OF THE DISCLOSURE

A storage system is provided in which randomly selected magnetic recording strips are ejected from individual storage cell chambers and carried by an entry path portion of a continuous transport to selected ones of a plurality of read-write processing stations. The strips are held by vacuum to pulley mounted belts for movement therewith and may be directed into the selected processing stations by the use of movable cornering guides. Processed strips are carried by a return path portion of the transport, and are directed into their storage chambers by pneumatically operated guide vanes.

BACKGROUND OF THE INVENTION

Field of the invention

The present invention relates to random access storage systems, and more particularly to improved systems which are capable of presenting desired portions of magnetic recording strips for recording and readout in rapid, random succession.

Description of the prior art

For some years data processing equipment has made extensive use of storage systems in which information is represented in the form of magnetic patterns on a magnetizable record medium. The information is recorded upon and read from the medium by magnetic transducers past which the medium is moved at a predetermined velocity. Conventional magnetic tape, disk and drum systems are some of the more common examples. Tapes are generally considered as sequential storage devices in that particular information bits or groups stored thereon are generally addressable only in the sequence in which they are stored. Disks and drums have random access capabilities since the surface portions upon which particular information is stored can generally be directly addressed. Both general forms of storage have particular attributes that make them attractive for certain applications. Tapes offer substantial storage volume in a minimum of physical space, while disks and drums provide more rapid and direct access to the information they store.

More recently, there has been developed a magnetic storage system which provides a combination of the attractive features of both the high storage capacity tape and the directly accessible disk or drum. Such a system employs record media in the form of plural strips of magnetizable material that are stored for random access and that can be handled for reading and writing in the general manner of a disk or drum. In one common type of magnetic strip system, a selected strip is accessed by moving the entire strip storage unit or a portion thereof so that the section containing the desired strip is brought to a selection station. At the station, the desired strip is identified, removed from the stored position and accessed to another station for processing. Upon completion of the processing, the strip is returned to its storage location and the procedure is repeated for the next desired strip. In another common type of magnetic strip system, a desired strip is removed from the strip storage unit and individually transported to the processing station. Upon completion of the processing, the strip is returned to its storage location via a path which may be the same as or different from the one over which it was accessed. Examples of the latter type of system are found in U.S. Patent 3,176,279 of Lin et al. and U.S. Patent 3,238,509 of Schnoor et al.

While random access strip storage systems provide a number of distinct advantages over other types of storage systems as noted above, such systems typically suffer from a number of shortcomings which may limit the effectiveness of the system depending upon the environment in which it is to be used. Systems of the type in which the entire strip storage unit or a portion thereof is moved typically require bulky and complex mechanisms for carying out such operation. Accessing may further require physical identification media on the strips such as tabs which are mechanically engaged for identification and removal. Such identification media are subject to wear or damage through prolonged use, leading to system error and requiring the periodic removal of strips from the system for repair or replacement of the media. Removal of one or more strips generally requires that operation of the system be temporarily halted, a procedure which may prove to be highly disadvantageous in situations such as where an associated computer is to operate continuously. Periodic replacement of one or more strips may become necessary where the strips are subjected to extensive wear or abuse during accessing and processing. In many presently known storage systems, rapid deterioration of the strips is caused by contact between the strips and parts which are at rest or in motion at a different speed relative to the strips. Such contact may cause wear both to the strips and to the magnetic coating forming the recording surface thereof. Early deterioration of the magnetic coating may result in the accessing and processing of a strip which provides an incorrect readout or recording. One of the more serious limitations of conventional storage systems is their inability to process more than one strip at a time. This may seriously limit the operating speed of an associated data processing unit, particularly where the processing of subsequent strips is held up pending the readout from or recording on a single processed strip in more than one location on the strip.

Ideally then, a random access storage system should be capable of accurately and quickly accessing magnetic recording strips in random succession without the need for physical identifying media which are subject to damage and wear. The system should be capable of the simultaneous processing of a plurality of the selected strips without the need for complex mechanical handling apparatus, and the strips themselves should be subjected to a minimum of mechanical handling to prevent damage and wear. Upon completion of the processing, the strips should be quickly returned to designated storage units so as to be available for further processing when needed. The system should provide for the removal of strips and the addition of new ones while in continuous operation.

BRIEF SUMMARY OF THE INVENTION

In brief, the present invention provides a random access storage system in which magnetic recording strips are selectively transported to different ones of a plurality of processing stations and back to designated storage cells by a continuous transport. The strips are stored in different ones of a plurality of storage cell chambers located between entry and return path portions of the continuous transport. Selection and ejection of the strips for processing is accomplished by apparatus which drives the selected ones of the strips out of the exit ends of their storage cells and into contact with rotating capstans which accelerate the strips to a speed substantially equal to that of the continuous transport.

The transport preferably comprises a plurality of endless belts mounted on rotatable pulleys for movement therewith. A reduced pressure within a vacuum plenum on one side of the belts holds the strips in contact with the belts for movement therewith. Each of the processing stations may be associated with a different one of a plurality of parallel paths in the transport in which event strips in the entry path portion of the transport are directed into the parallel paths of desired processing stations by movable cornering guides which form a part of the transport. A movable pulley in each of the movable cornering guides is placed in either of two different positions to direct a strip into an associated processing station or alternatively along the entry path portion of the transport to other processing stations. Alternatively, the processing stations may be serially arranged along a single portion of the transport which is shared by strips entering and returning from the different stations.

Each of the processing stations preferably comprises vacuum rings which rotate at a selected speed within a cavity of the station housing. Strips are gated into the housing cavity where they are held in contact with the vacuum rings for rotation therewith. Magnetic read-write heads on a head bar follow selected ones of a plurality of tracks on the strip for processing. The strip is circulated within the processing station as many times as are necessary to perform one or more reading and writing operations, then is gated out of the station and into the return path portion of the transport.

Strips in the return path portion of the transport are directed into their storage chambers by pneumatically operated guide vanes which extend into the return path portion when a plurality of tubes extending along a portion of the length thereof are pressurized. Each guide vane is moved laterally to a selected one of the chambers within an associated storage cell. A pneumatic brake decelerates the strip at the entry end of the selected storage chamber, and the strip comes to rest within the chamber upon striking stop apparatus located near the exit end thereof.

Each strip is assigned to a particular cell chamber for storage and is returned to the assigned chamber after each processing. The strips are accordingly identified by their positions within the storage cells, and the need for undesirable identification tabs or similar media is eliminated. Undue wear of the strip oxide coating is prevented by handling each strip on the side thereof opposite the coating.

In accordance with one preferred embodiment of the invention, strips are secured for storage within the storage chambers by selecting fingers which engage the top and bottom edges of each strip to hold it in an elevated position. Accessing of a selected strip for processing is accomplished by causing the associated selecting fingers to lower the strip from its elevated position into the path of a kicker bar. The kicker bar strikes the strip, driving it out of the chamber and into contact with the associated accelerating capstan.

In accordance with another preferred embodiment of the invention, strips are secured for storage within the chambers by fingers which are movable into engagement with notches in the bottom edges of the strips. Accessing of a selected strip is accomplished by disengaging the associated finger from the strip notch and striking the trailing edge of the strip with an associated hammer. The strip is driven out of the chamber and into contact with the associated accelerating capstan by further movement of the hammer under the control of a single revolution cam and associated cam follower.

Single strips are added to and removed from the storage system while in operation by means of a single strip insertion and removal station disposed between the entry and return path portions of the transport. The station includes a stiff-walled envelope which is receivable within a receptacle in the storage system. Flexure of the envelope walls holds the opposite ends open enabling a strip stored therein to be directed into the transport for processing or storage or a strip in the return path portion of the transport to be received therein for removal.

BRIEF DESCRIPTION OF THE DRAWINGS

The foregoing and other objects, features and advantages will be apparent from the following more particular description of preferred embodiments of the invention, as illustrated with the accompanying drawings.

DETAILED DESCRIPTION

Figure 1:
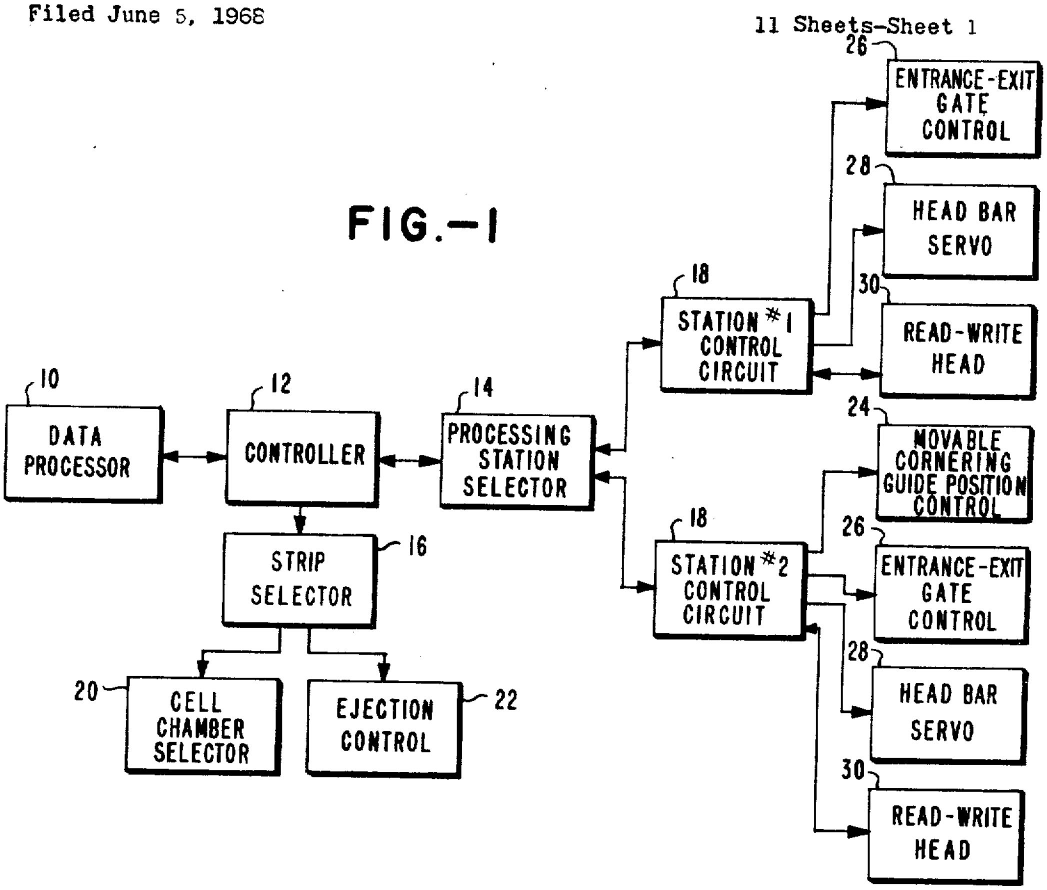
FIG. 1 is a block diagram of an information storage and retrieval system in accordance with the invention.

A better appreciation of the various features and advantages of storage systems in accordance with the invention may be had by briefly considering the manner in which such systems function to store and retrieve information when employed with a data processing device such as a general purpose computer. FIG. 1 illustrates a data processor 10 which may comprise any device or system having a requirement that stored information be periodically supplied thereto as rapidly and as accurately as possible. The data processor 10 may have the additional requirement that information be rapidly stored for future use. It is assumed for the purposes of discussion that the volume of information to be stored and the speed with which it must be written and read back to the data processor 10 dictate a random access type of storage arrangement. Were it not for these requirements, a conventional magnetic tape could be used to serve the needs of the data processor 10.

In accordance with the present invention, information for the data processor 10 is stored and retrieved by a random access magnetic strip storage system which is capable of randomly writing and reading information in extremely rapid and accurate fashion. The operation of the system is controlled by a controller 12 which receives command signals from the data processor 10 indicating where new information is to be stored and the stored information that is to be read out. The controller 12 responds to the data processor command signals by generating a first signal indicating the strip data track on which information is to be written or read back and a second signal indicating the particular strip that is to be used. The first signal from the controller 12 is fed to a processing station selector 14 to secure the use of a read-write processing station as soon as one is available. The second signal from the controller 12 is fed to a strip selector 18 to access a selected strip for processing.

In the present instance, it is assumed for purposes of illustration that the storage system has two processing stations. In actual practice, any number of processing stations can be used in accordance with the invention. If both processing stations are in use, the station selector 14 stores the first signal from the controller 12 until such time as at least one of the processing stations becomes available.

When it is determined by the station selector 14 that a station is available for processing, the first signal from the controller 12 is routed to a control circuit 18 corresponding to the available station. The strip selector 16 causes the selected strip to be ejected from an associated storage cell chamber by means of a cell chamber selector 20 and an ejection control 22. The ejected strip is accelerated to a speed approximating that of a continuous transport and is carried along an entry path portion of the transport to the vicinity of the processing stations.

The processing stations may be located in different parallel path portions of the transport, or alternatively may be arranged serially along a single portion of the transport. In FIG. 1, it is assumed that the first processing station is located within a portion of the transport downstream from the entry path portion and that the second processing station is located within an alternate parallel path of the transport. As the ejected strip reaches the end of the entry path portion of the transport, it approaches a movable cornering guide. If the second processing station has been chosen to process the selected strip, the associated control circuit 18 switches the position of the movable cornering guide via a movable cornering guide position control 24 to direct the strip into the alternate parallel path in which the second station is located. If the first station has been selected for processing, the movable cornering guide remains in its normal position to direct the strip toward the first station for processing.

As the selected strip approaches the chosen processing station, it is caused to enter the station by actuation of an entrance-exit gate control 26, which actuation places an associated gate in its "entrance" position. A head bar servo 28 then positions a magnetic read-write head 30 adjacent the selected data track of the strip, and processing is performed using the head 30.

Upon completion of processing, the strip is gated out of the station and into a return path portion of the continuous transport by the entrance-exit gate control 26 which positions the associated gate in its "exit" position. The strip is then directed into its storage cell chamber by the strip selector 16 and the cell chamber selector 20.

The controller 12 additionally includes appropriate apparatus such as a process control computer for controlling strip traffic within the continuous transport. Inputs are provided to the process control computer by appropriate detection elements such as photoelectric sensors strategically located throughout the system. Sensors located within the entry and return path portions of the continuous transport, for example, aid in controlling the flow of strips into and out of the vicinity of the processing stations, while sensors within the stations effect the timed gating of strips out of the stations.

As will be apparent from the discussion to follow, the presence of more than one read-write processing station within the storage system provides for the simultaneous processing of a plurality of magnetic strips. The first signal from the controller 12 is routed by the station selector 14 to the control circuit 18 of any available processing station. If all stations are in use, the signal is stored by the station selector 14 until a station becomes available.

Figure 2:
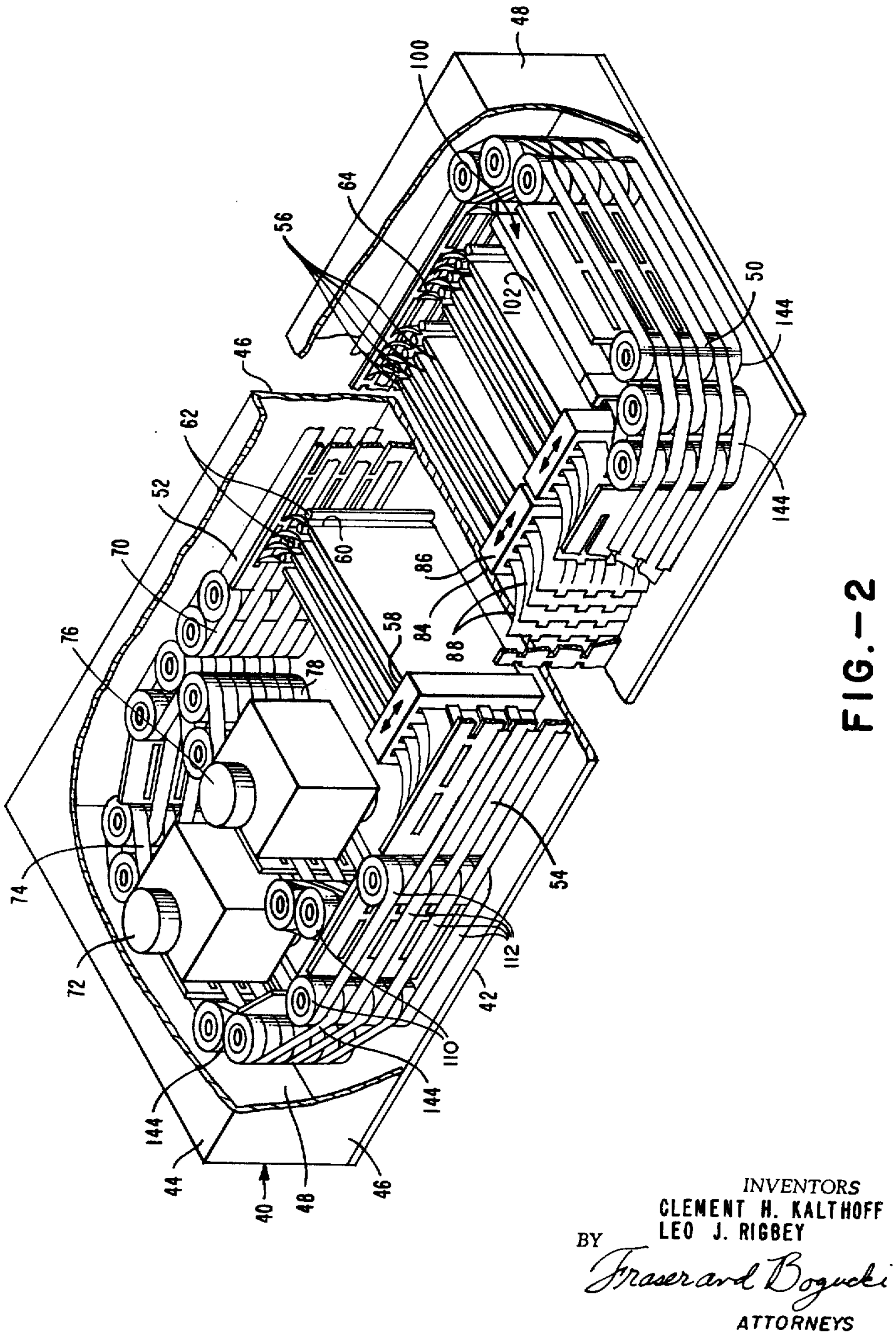
FIG. 2 is a partly broken away perspective view of the basic elements of a strip storage system in accordance with the invention.
Figure 3:
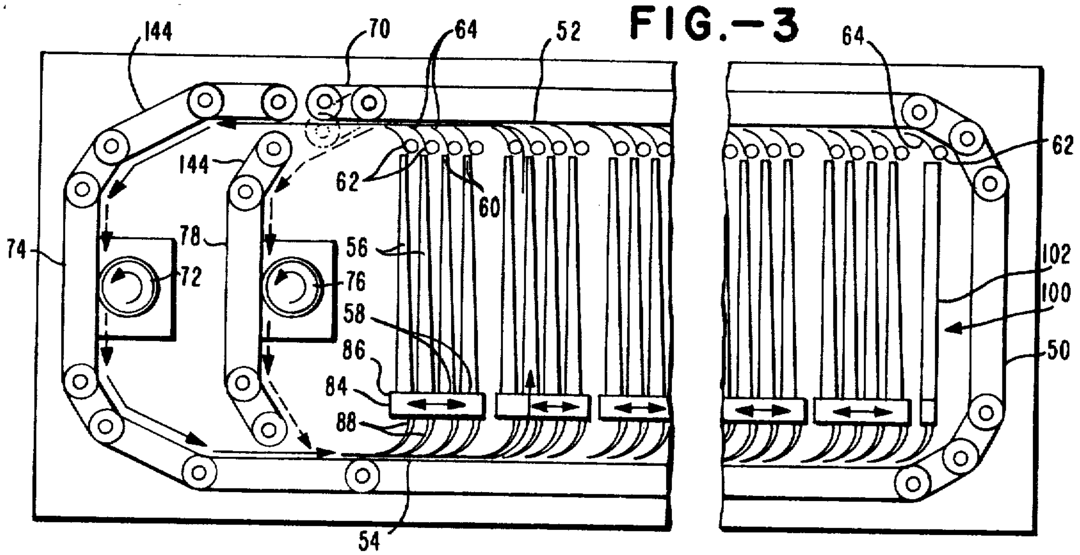
FIG. 3 is a simplified plan view of the system of FIG. 2 showing the directions of strip movement within the system.

One preferred arrangement of a storage system in accordance with the invention is shown in FIGS. 2 and 3. The system is generally enclosed within a housing 40 having a main base plate 42, a cover plate 44, a pair of opposite side walls 46 and a pair of opposite end walls 48. A continuous transport 50 defines a circuitous path including an entry path portion 52 and a return path portion 54 adjacent different ones of the side walls 46. Disposed between the entry and return path portions 52 and 54 and removably mounted on the main base plate 42 are a plurality of strip storage cells 56, each of which has a plurality of generally parallel storage chambers therein. Each of the storage cells 56 has an open entry end 58 located adjacent the return path portion 54 of the transport and an open exit end 60 located adjacent the entry path portion 52 of the transport. Each of the plurality of generally parallel storage chambers within each cell 56 is configured to store a single magnetic recording strip. Under the control of the strip selector 16, the cell chamber selector 20 and the ejection control 22 (FIG. 1), the strip which has been selected for processing is driven out of the exit end 60 of its storage cell 56 and into contact with an associated acelerating capstan 62. The capstan 62 drives the strip along an associated exit guide 64 and into the entry path portion 52 of the transport, while at the same time increasing the speed of the strip to approximately that of the transport.

The strip is carried along the entry path portion 52 of the transport to a movable cornering guide 70. If a first station 72 has been chosen by the station selector 14 (FIG. 1) for processing, the movable cornering guide 70 remains in its normal position as shown in FIG. 2 and in solid outline in FIG. 3 to direct the strip along an end path portion 74 of the transport and to the first processing station 72. A second processing station 76 is located within an alternate parallel path portion 78 of the transport. If the second station 76 is to be used for processing, the associated movable cornering guide position control 24 (see FIG. 1) moves the cornering guide 70 into an alternate position as shown in dotted outline in FIG. 3 to direct the selected strip into the alternate parallel path portion 78 of the transport and to the second station 76. The selected strip is gated into the selected station, processed, gated out of the station and carried to the return path portion 54 in the manner described above in connection with FIG. 1.

The strip in the return path portion 54 is directed into a selected one of the storage cells 56 and into a selected storage chamber within the cell by an appropriate one of a plurality of strip restoring mechanisms 84. Each of the restoring mechanisms 84 includes a housing 86 which is laterally movable relative to the entry ends 58 of four different storage cells 56 and four return guides 88 which extend between the entry ends 58 of the associated cells and positions adjacent the return path portion 54. The cell chamber selector 20 (see FIG. 1) selects the particular storage cell 56 and chamber therein in which the strip is to be stored by moving the associated strip restoring mechanism 84 so as to align one of the return guides 88 with the chosen chamber. At the same time, the return guide 88 is pneumatically actuated so as to move from its position adjacent the return path portion 54 to a position within the return path portion. The strip is scooped off the return path portion 54 by the actuated return guide 88, decelerated as it passes through the housing 86, directed into the chosen cell chamber and stored therein.

The particular arrangement of a storage system shown in FIGS. 2 and 3 utilizes parallel transport paths to provids acess to more than one processing station for the simultaneous processing of a plurality of strips. Although two processing stations 72 and 76 are shown for purposes of illustration, it should be understood that any number of processing stations can be used as desired. Additional processing stations could be added to the arrangement of FIGS. 2 and 3 simply by providing a movable cornering guide 70 and an alternate parallel path portion 78 for each additional station. The parallel path arrangement shown in FIGS. 2 and 3 is advantageous in that the least amount of strip traffic interference is provided. For some applications of thet storage system, however, the time required to switch the various movable cornering guides 70 and to pass the various strips along the alternate parallel path portions 78 between the entry and return path portions of the transport may be considered excessive. If such is the case, an alternative arrangement shown in FIG. 4 may prove to be more desirable. This arrangement allows the largest number of processing stations in the least amount of space.

Figure 4:
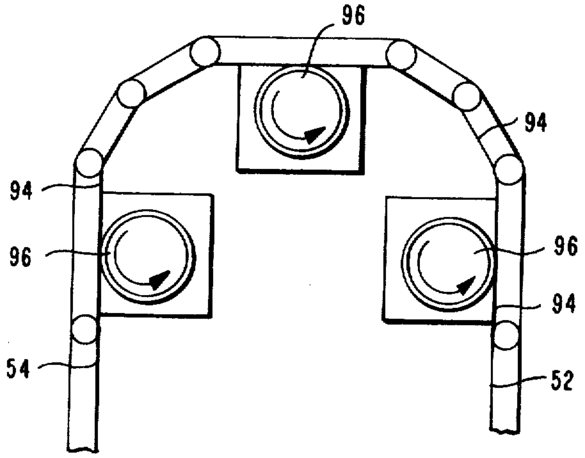
FIG. 4 is an idealized showing of an alternative arrangement of a strip storage system in accordance with the invention.

In the arrangement of FIG. 4, as seen in plan view, the various processing station are arranged serially rather than in the parallel manner shown in FIGS. 2 and 3. Strips in the entry path portion 52 of the transport are carried to a single extended portion 94 having a plurality of processing stations 96 spaced therealong. Each strip is carried to a chosen one of the processing stations 96 by-passing all other stations along the way. At the chosen station, the strip is gated into the station for processing, then gated out of the station and carried along the single exended portion 94 of the transport to the return path portion 54.

During operation of the storage system, individual strips may be inserted into the system or removed therefrom by a single strip insertion and removal station 100 shown in FIGS. 2 and 3. By removal of a small portion of the cover plate 44, access may be had to the station 100. A strip to be entered into the storage system is placed within a stiff-walled envelope 102 and the envelope, in turn, is inserted through the open portion of the cover plate 44 and clamped in place. The enclosed strip is then ejected from the envelope 102 and carried into the entry path portion 52 of the transport via an associated accelerating capstan 62 and an exit guide 64. The inserted strip is carried by the entry path portion 52 to either the end path portion 74 or the alternate parallel portion 78 where it may be processed in the associated station if desired before being carried to the return path portion 54. The inserted strip is then directed into a particular storage cell 56 and chamber therein by the associated strip restoring mechanism 84. A strip to be removed from the storage system is ejected and driven into the entry path portion 52, processed in either of the stations 72 or 76 if desired, then carried along the return path portion 52 to a return guide 88 associated with the single strip insertion and removal station 100. Actuation of the return guide 88 directs the strip into the stiff-walled envelope 102. The envelope 102 is then removed from the system and the removable portion of the cover plate 44 is replaced as desired.

Figure 5:
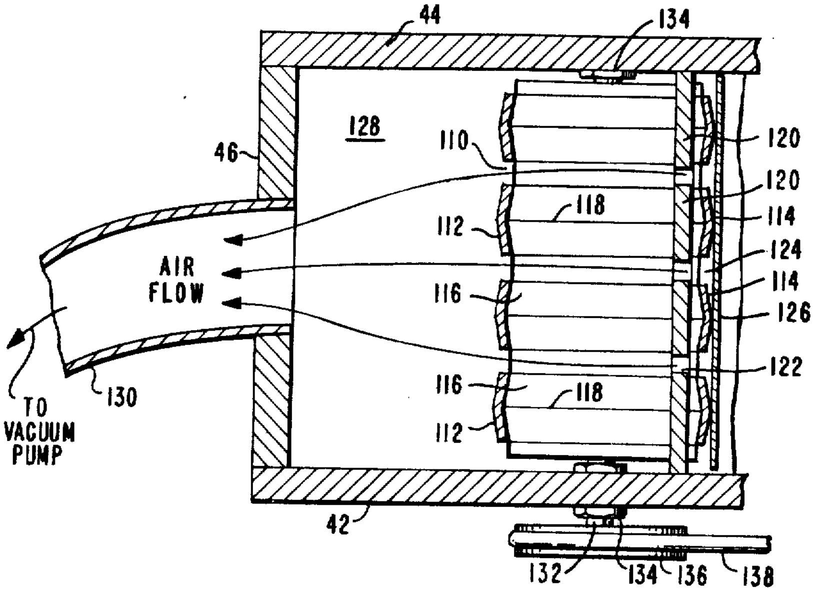
FIG. 5 is a sectional view of one portion of the system of FIG. 2 illustrating the details of the continuous strip transport.

The continuous transport 50 includes a plurality of generally cylindrical shaped pulleys 110 which are mounted between the main base plate 42 and the cover plate 44 for rotation about their central axes. A plurality of endless belts 112 extend around and between each of the pulleys 110 and an adjacent pulley. As best shown in FIG. 5, the endless belts 112 are mounted on the pulleys 110 so as to be generally parallel to and spaced apart from one another and the cover plate 44 and main base plate 42. Belt portions 114 which extend between the sides of the pulleys 110 opposite the side walls 46 and the end walls 48 define the path of the continuous transport 50, and it is these portions of the belts which carry the magnetic recording strips. The belts 112 are held in position relative to the axis of the pulleys 110 by crowned areas 116 in the pulley outer surface, which areas extend from the opposite edges of the belts to a region 118 of maximum diameter. A plurality of elongated belt supports 120 are disposed adjacent the inside surfaces of the strip carrying portions 114 of the endless belts 112 in generally parallel, spaced apart relation to form elongated spaces 122 therebetween. The elongated spaces 122 are generally aligned with the elongated spaces 124 between adjacent ones of the belts 112.

As shown in FIG. 5, a magnetic recording strip 126 is held to the belts 114 for movement therewith by a reduced pressure relative to ambient in the region of the belts. A vacuum plenum 128 extends about the outside of the continuous transport 50 and is defined by the strip carrying portions 114 of the belts 112, the main base plate 42, the cover plate 44 and the side walls 46 or end walls 48 of the system housing. A reduced pressure is established within the plenum 128 by any appropriate means such as a plurality of flexible hoses 130 extending between the plenum and individual vacuum pumps (not shown). In one particular arrangement of a storage system constructed and operated in accordance with the invention, a reduced pressure within the vacuum plenum is provided by flexible hoses coupled to vacuum pumps as shown in FIG. 5. In an alternative arrangement, the reduced pressure within the plenum is provided by a cooling type blower which is mounted in an enclosure below the main base plate 42 and which communicates with the plenum via apertures in the base plate. The reduced pressure within the vacuum plenum 128 causes a flow of air between the belts 112 and through the elongated spaces 122 and into the plenum causing the strip 126 to be held to the belts 112 for movement therewith.

Since a substantial number of the pulleys 110 within the entire transport 50 are indirectly coupled to one another by the belts 112, it is only necessary to drive some of the pulleys. The pulleys may be driven by any appropriate driving means such as that partially shown in FIG. 5. The pulley 110 is rigidly mounted on a shaft 132, the shaft having its opposite ends rotatably mounted relative to the cover plate 44 and the main base plate 42 by bearings 134. A pulley 136 rigidly mounted on one end of the shaft 132 is rotatably driven via a drive belt 138, the belt being driven by an appropriate motor or gear arrangement (not shown).

The relatively straight portions of the continuous transport 50, such as the entry and return path portions 52 and 54, are formed by arranging the included pulleys 110 along a substantially straight line as shown in FIGS. 2 and 3. Those portions of the transport which are curved, such as the end path portion 74 and the alternate parallel path portion 78, are formed by arranging the included pulleys 110 along a curved line causing the belts which extend between a pulley and an immediately adjacent pulley on one side thereof to form a discreet angle with the belts which extend between the pulley and an immediately adjacent pulley on the other side thereof. Each pair of the pulleys and the belts which extend therebetween form a fixed cornering guide 144. The angles at which the fixed cornering guides 144 may be disposed relative to one another are determined at least in part by the speed at which the strips are to be transported. It has been found, for example, that strips travelling at speeds of 750 inches per second or greater can negotiate fixed cornering guides 144 placed at angles of 30° relative to one another without noticeable damage or wear to the strips after prolonged use.

Figure 6:
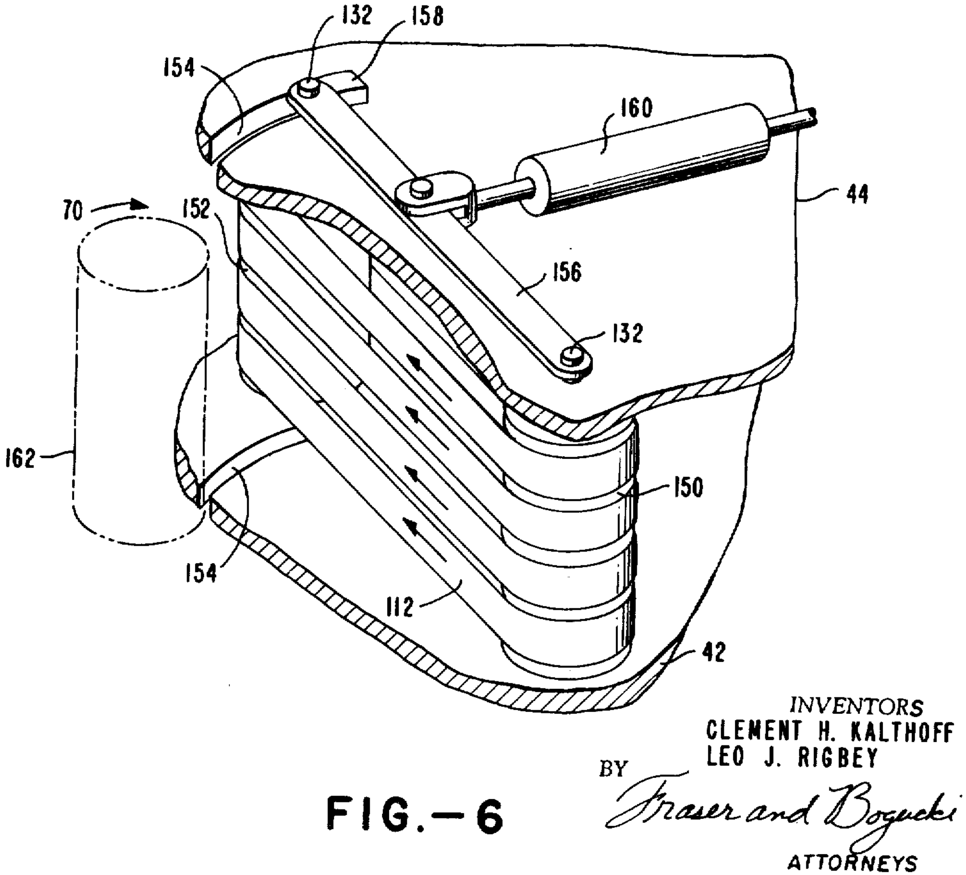
FIG. 6 is a perspective view of a movable cornering guide used in the system of FIG. 2.

The movable cornering guide 70 is shown in greater detail in FIG. 6. An upstream pulley 150 is rotatably mounted on the cover plate 44 and the main base plate 42 in a manner similar to that shown for pulley 110 in FIG. 5, except that the upper and lower ends of the supporting shaft 132 extend above and below the cover plate 44 and the main base plate 42 respectively. A downstream pulley 152 is mounted on a shaft 132, the opposite ends of which extend through slots 154 in the cover plate 44 and main base plate 42 and are rotatably received within lever arms 156. Only the top lever arm 156 is shown in FIG. 6 for the sake of clarity. The lever arms 156 normally rest against limit blocks 158 when the corning guide is in its normal or first position. When in such position, the cornering guide passes strips from the entry path portion 52 of the transport into the end path portion 74 and to the first processing station 72 (see FIGS. 2 and 3).

When the movable cornering guide 70 is to be moved into a second position to direct strips from the entry path portion 52 of the transport into the alternate parallel path portion 78 and to the second processing station 76, the lever arms 156 are caused to pivot about the shaft 132 of the upstream pulley 150 under the force of associated pneumatically operated cylinders 160. The downstream pulley 152 is caused to assume a second position 162 shown in dotted line in FIG. 6 by the lever arms 156 which come to rest against another pair of limit blocks not shown in FIG. 6 for the sake of clarity. The central axis of the downstream pulley 152 is caused to remain equidistant from the central axis of the upstream pulley 150 in both the first and second positions to maintain uniform tension within the endless belts 112 which extend around and between the pulleys. The distance between the upstream and downtream pulleys 150 and 152 is relatively short. Accordingly, if the strips are travelling at a high enough speed, they will be carried into the alternate parallel path portion 78 of the transport by the movable cornering guide 70 in the absence of a reduced pressure in the region of the belt 112 when the guide is in its second position 162. In an alternative arrangement vacuum may be provided by communication with a low pressure area through holes in the main base plate 42. When the guide is in its normal or first position, a reduced pressure is provided by the vacuum plenum 128 which extends along the one side wall 46 of the storage system.

Figure 7:
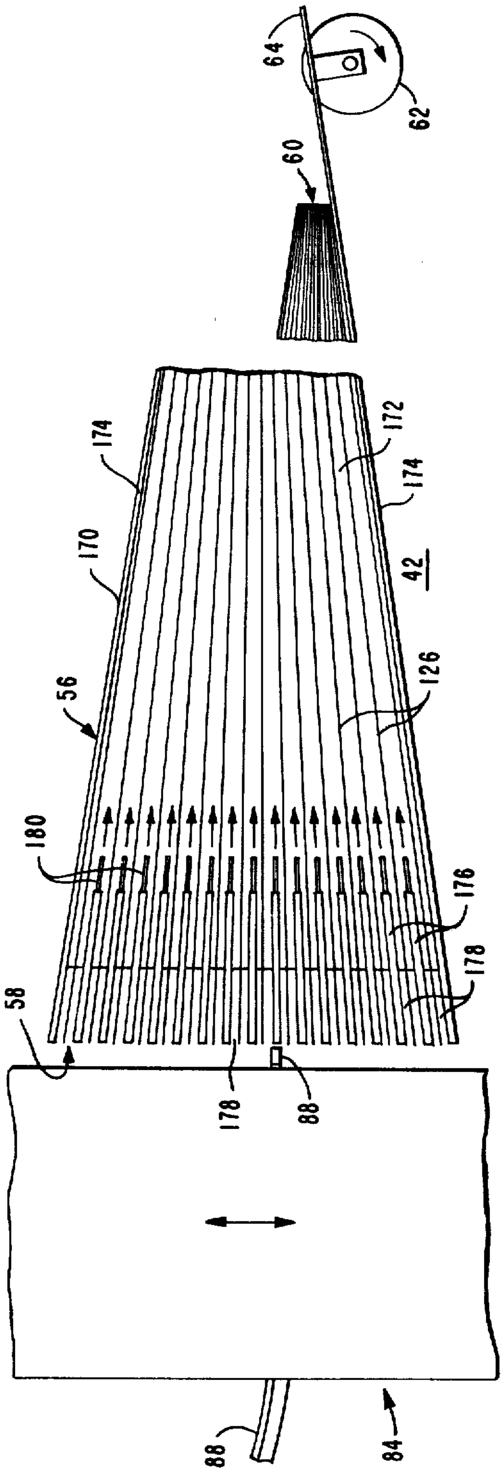
FIG. 7 is a top sectional view of a storage cell employed in the system of FIG. 2.

The interior details of a typical one of the storage cells 55 are shown in FIG. 7. The cell 56 has a housing 170 including a bottom wall 172, a top wall (not shown), and opposite side walls 174 which cause the cell to converge from a maximum width at the open entry end 58 to a minimum width at the open exit end 60. Mounted within the entry end 58 and in generally parallel, spaced apart relation are a plurality of separators 176 which serve to divide the interior of the cell into individual storage chambers 178. Each storage chamber 178 is defined by the space between an adjacent pair of the separators 176 and is capable of storing a single one of the strips 126. An air nozzle 180 extends from each of the separators 176 in a direction toward the exit end 60 of the cell to provide an air film between the adjacent pair of strips 126 when coupled to a source of pressurized air. The air films provided by the nozzles 180 keep the strips 126 separated while stored in the cell 56 and prevent a selected strip which is ejected from the cell for processing from damaging contact with the adjacent stored strips. The cell 56 is an integral unit removably mounted on the main base plate 42 of the storage system housing. When the storage system is shut down, each of the cells 56 may be removed from the system if desired.

Strips 126 which are stored in the cell 56 are ejected for processing by being driven out of the exit end 60 at a speed considerably slower than that of the continuous transport 50. Since the cell converges toward its exit end, an ejected strip regardless of its location within the cell comes into contact with the accelerating capstan 62. The ejected strip is accelerated by the capstan to a speed substantially equal to that of the continuous transport 50 as it is driven along the exit guide 64 and into the transport. When a strip in the return path portion 54 of the transport is to be stored in the cell 56, the associated strip restoring mechanism 84 is moved laterally so as to position the return guide 88 at the entry end of the selected one of the storage chambers 178. The return guide 88 is then pneumatically actuated to scoop the strip off the return path portion 54 and direct it into the desired chamber 178. The entering strip is decelerated by means located within the housing 86 of the strip restoring mechanism 84 and is brought to rest by a stop and positioning mechanism at the exit end 60 (not shown in FIG. 7).

Figure 8:
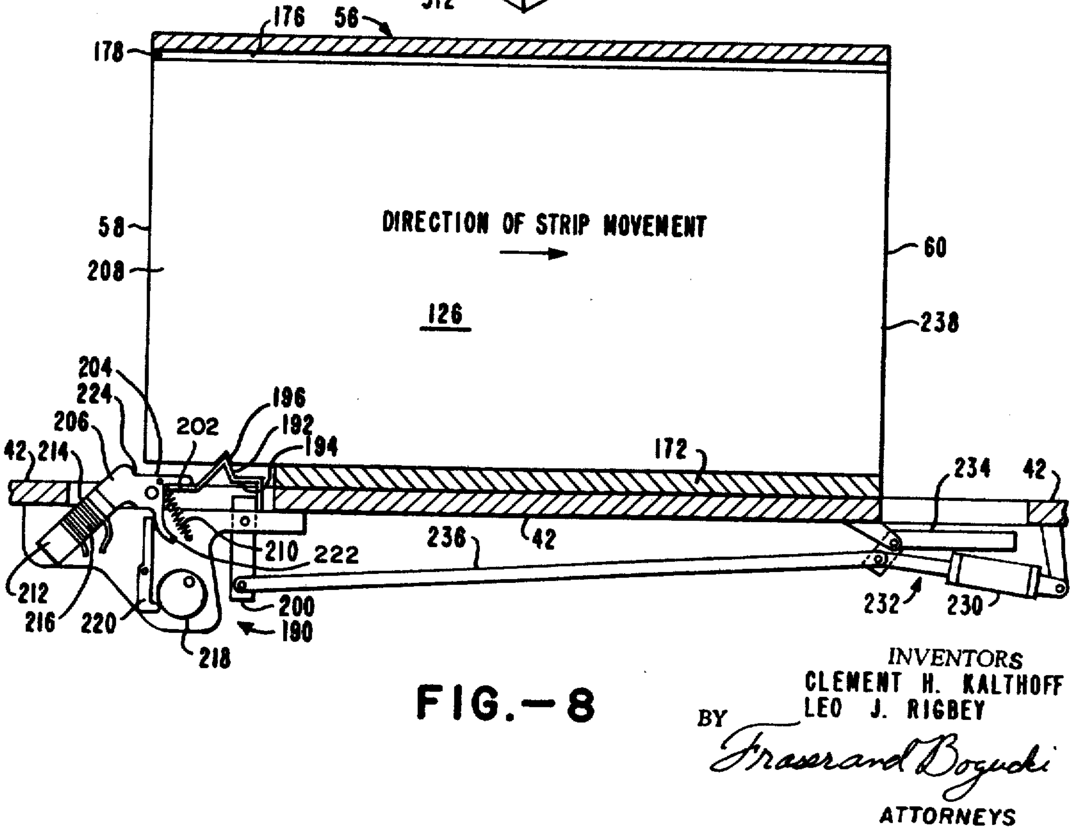
FIG. 8 is a sectional view of one arrangement for storing strips in and ejecting them from individual storage cell chambers.
Figures 9, 10:
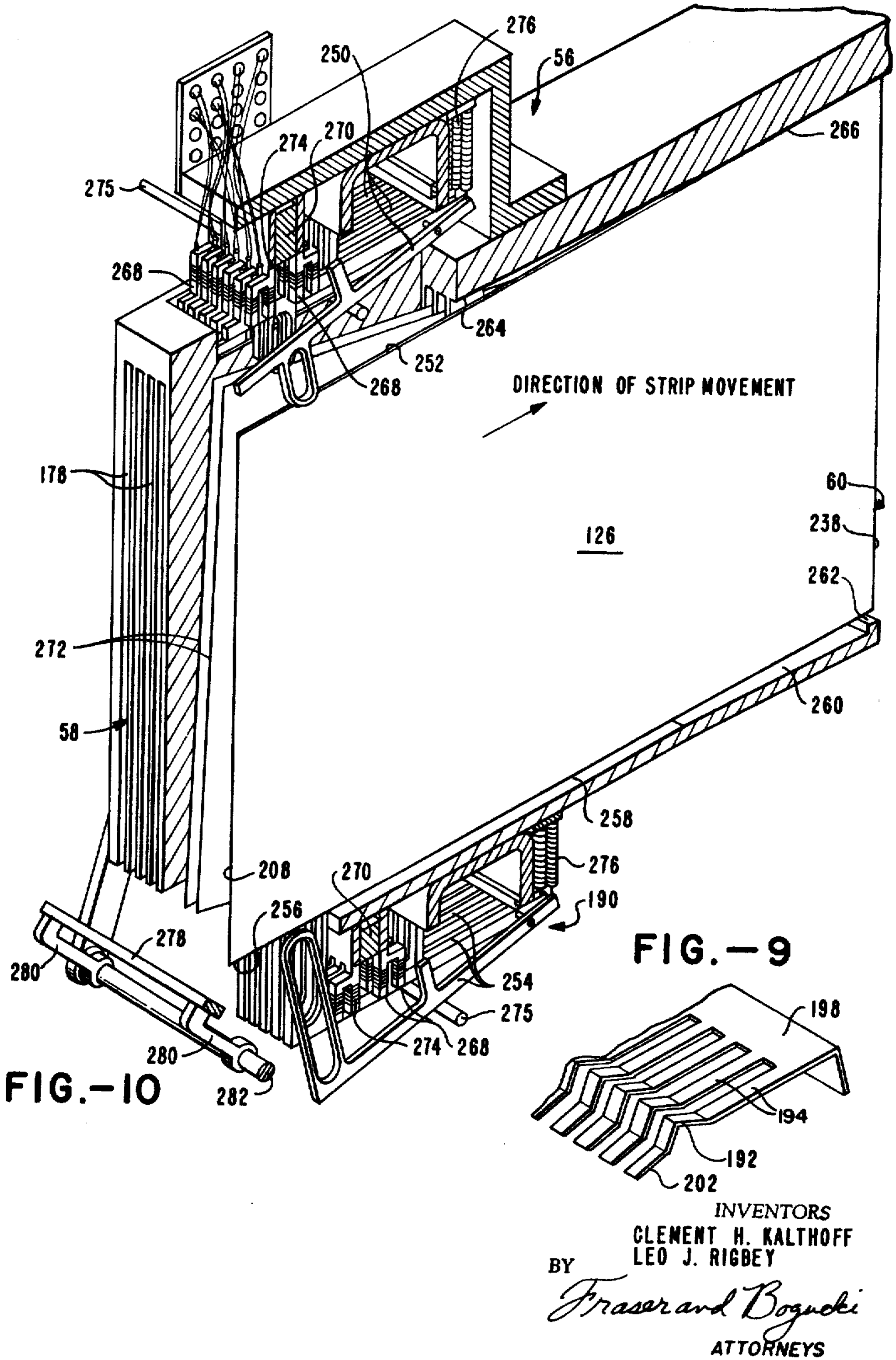
FIG. 9 is a perspective view of a portion of a spring finger arrangement used in the arrangement of FIG. 8.
FIG. 10 is a perspective view of an alternative arrangement for storing strips in and ejecting them from individual storage cell chambers.

One particular arrangement of a mechanism 190 for selecting a particular strip 126 and ejecting it from the storage cell 56 is shown in FIG. 8. Each of the strips 126 is maintained in a stored position within its cell chamber 178 by the engagement of a raised portion 192 of a restraining finger 194 within a notch 196 in the bottom edge of the strip 126. As shown in FIG. 9, the fingers 194 are part of a leaf spring 198 which is mounted on a pivot bar 200 so as to extend across the bottom edges of all of the strips 126 within the cell 56 and present a different finger 194 to each of the strips 126.

The free end 202 of each finger 194 is engaged by a projection 204 of a different one of a plurality of pivotably mounted hammers 206. Each hammer 206 is urged in a direction toward the trailing edge 208 of the strip 126 by a coil spring 210, but is normally held in a position away from the trailing edge 208 and against the urging of the spring 210 by a no-work flux division magnet 212. The magnet 212 extends across the entry end 58 of the storage cell 56 and has a plurality of pole pieces 214 for engagement with different ones of the hammers 206. Each of the pole pieces 214 has a coil 216 wound thereabout.

When a particular one of the strips 126 is to be ejected from the cell 56, the coil 216 which is wound about the pole piece 214 is energized to create a magnetic field opposing and approximately equal to that of the magnet 212 to release the hammer 206. The released hammer moves forward under the urging of the coil spring 210, the forward movement of the hammer being controlled by an eccentrically mounted cam 218 and associated cam follower 220 which are common to all of the hammers 206. When the hammer 206 is released from its associated pole piece 214, the cam 218 is in a rotational position so as to present its maximum radius to the engaged, pivotably mounted cam follower 220. The opposite side of the follower 220 engages a second projection 222 of the hammer 206 to limit the forward movement of the hammer. The cam 218 is then rotated through a single revolution at a controlled speed by appropriate means such as a motor and a single revolution clutch (not shown). During the first half of the cam revolution, the follower 220 is pivoted in a direction to allow forward movement of the hammer 206 at a controlled speed. A striking surface 224 on the hammer 206 is brought into contact with the trailing edge 208 of the strip 126, and the continued forward movement of the hammer drives the strip out of the cell 56 and into contact with the associated accelerating capstan 62 at a controlled speed.

The raised portion 192 of the associated restraining finger 194 is lowered out of engagement with the notch 196 by the hammer projection 204, enabling the strip to be driven out of the cell by the hammer. All other raised portions 192 of the restraining fingers 194 remain engaged within the notches 196 of their associated strips 126. As the ejected strip leaves the storage cell 56, the cam 218 rotates through the second half of its single revolution to return the hammer 206 to the pole piece 214. The coil 216 is no longer energized and the hammer remains in contact with the pole piece.

When a strip 126 in the return path portion 54 of the transport is to be directed into one of the chambers of the cell 56 for storage, a solenoid 230 within a strip stop and positioning mechanism 232 is energized to move a pivotably mounted stop member 234 from its normally lowered position to a raised position over the exit end 60 of the cell 56. A connecting bar 236 is coupled between the stop member 234 and the pivot bar 200 within the strip selection and ejection mechanism 190. As the stop member 234 is raised to its upper position, the corresponding movement of the connecting bar 236 pivots the bar 200 in a direction so as to lower all of the fingers 194 of the leaf spring 198 and remove the associated raised portions 192 from engagement with the strip notches 196. The entering strip is thereby able to move into the selected cell chamber 178 unimpeded by the finger raised portion 192. When the strip 126 reaches the exit end 60 of the cell 56, the leading edge 238 thereof strikes the raised stop member 234 bringing the strip to rest within its chamber. The solenoid 230 is then de-energized to lower the stop member 234 and raise the finger raised portions 192 into engagement with the strip notches 196 by the action of the connecting bar 236.

FIGS. 8 and 9 illustrate one particular arrangement of a strip selection and ejection mechanism 190 in accordance with the invention. An alternative arrangement is shown in FIG. 10. In the particular arrangement shown in FIG. 10, the individual strips 126 are raised into an elevated position for storage by a separate pair of selecting fingers associated with each of the strips. Each pair of selecting fingers includes an upper finger 250 which engages the top edge 252 of the strip and a lower finger 254 which engages the bottom edge 256 of the strip. The bottom surface 258 of the storage cell 56 is substantially horizontal or level from the cell entry end 58 to a point approximately two-thirds of the distance to the exit end 60. The remaining one-third of the bottom surface 258 slopes downwardly along a portion 260 thereof to the cell exit end 60 where it terminates in an upwardly extending lip 262. The top surface 264 of the cell 56 slopes in a downward direction from the entry end 58 at a rate approximately equal to that of the downwardly sloping portion 260 of the bottom surface 258. The sloping of the top surface 264 terminates at a point immediately above the point where the downwardly sloping portion 260 of the bottom surface 258 begins, and the remaining portion 266 of the top surface 264 which extends to the exit end 60 is substantially horizontal.

The upper and lower selecting fingers 250 and 254 associated with each of the cell chambers 178 are normally held in a raised position against the pole pieces 268 of no-work flux diversion magnets 270. The upper and lower selecting fingers 250 and 254 engage the top and bottom edges 252 and 256 of the associated strip 126, and when in the raised position against the pole pieces of the magnets 270 hold the strip in an elevated position for storage as illustrated by two different strips 272 in FIG. 10. When in the elevated position, a portion of the top edge 252 of the strip resides against the downwardly sloping position of the top surface 264 and a portion of the bottom edge 256 resides against the downwardly sloping portion 260 of the bottom surface 258. The lower portion of the leading edge 238 of the strip resides against the upwardly extending lip 262 preventing movement of the strip out of the cell 56 while in its elevated position.

When a particular strip 126 within the storage cell 56 is to be accessed for processing, coils 274 which are wound about the pole pieces 268 holding the associated selecting fingers 250 and 254 in the raised position are momentarily energized to provvide magnetic fields which oppose and cancel those of the magnets 270. The selecting fingers 250 and 254 are released from the pole pieces 268 and are pivoted to a lowered position under the force of associated coil springs 276. The selected strip 126 moves with the associated upper and lower fingers 250 and 254 out of its elevated position and into a lower position with a portion of the bottom edge 256 resting against the horizontal portion of the bottom surface 258 and a portion of the top edge 252 positioned adjacent the horizontal portion 266 of the top surface 264. An elongated kicker bar 278 is then moved into contact with the lower portion of the trailing edge 208 of the selected strip to drive it out of the cell 56. With the selected strip in its lowered position, the leading edge 238 thereof is positioned above the upwardly extending lip 262, and the strip may be freely driven out of the cell without interference by the lip. The elongated kicker bar 278 is mounted for movement about an axis generally parallel to its axis of elongation by a pair of support brackets 280 which extend between the bar 278 and a rotatable shaft 282. The bar 278 is mounted so as to strike the trailing edge 208 of only that strip which has been lowered and to pass under the trailing edges of all strips which are stored in the elevated position. The forward movement of the kicker bar 278 may be controlled by any appropriate apparatus such as the cam arrangement used to drive the hammers 206 in the embodiment of FIG. 8. In one particular arrangement employing strip selection and ejection mechanisms 190 of the type shown in FIG. 10, the kicker bar 278 is driven by a voice coil motor, the linear motion of the motor being converted to a rotary motion by a modified Watt straight line mechanism. Under the control of the voice coil motor, the kicker bar 278 is driven forward so as to impact the selected strip at a velocity of approximately 16 inches per second, moving the strip forward a distance of approximately 0.030 inch. A photocell located within the storage cell 56 detects such initial movement of the strip and causes the voice coil motor to be switched to a high output mode imparting to the strip a terminal velocity of approximately 64 inches per second. The kicker bar 278 is then restored to its original position by the voice coil motor and the ejected strip is accelerated to the speed of the continuous transport (typically about 750 inches per second) by the associated accelerating capstan 62.

When a strip in the return path portion 54 of the transport is to be directed into a particular storage cell chamber 178, the associated upper and lower selecting fingers 250 and 254 are positioned to their lowered positions by the momentary energization of the associated coils 274. The returning strip enters the chamber 178 and is brought to rest by the associated stop and positioning mechanism (shown in FIG. 11). The coils 274 are then de-energized, and resetting bars 275 positioned beneath the fingers are actuated to raise the selecting fingers to the raised position against the pole pieces 268 to store the strip in its elevated position. A solenoid actuator (not shown) moves the resetting bars 275. The upper assembly which includes the upper selecting fingers 250 and associated magnet 270 may be pivotably mounted to the storage system housing 40 so that it may be raised out of the way to permit removal of the storage cell 56 from the storage system.

Figure 11:
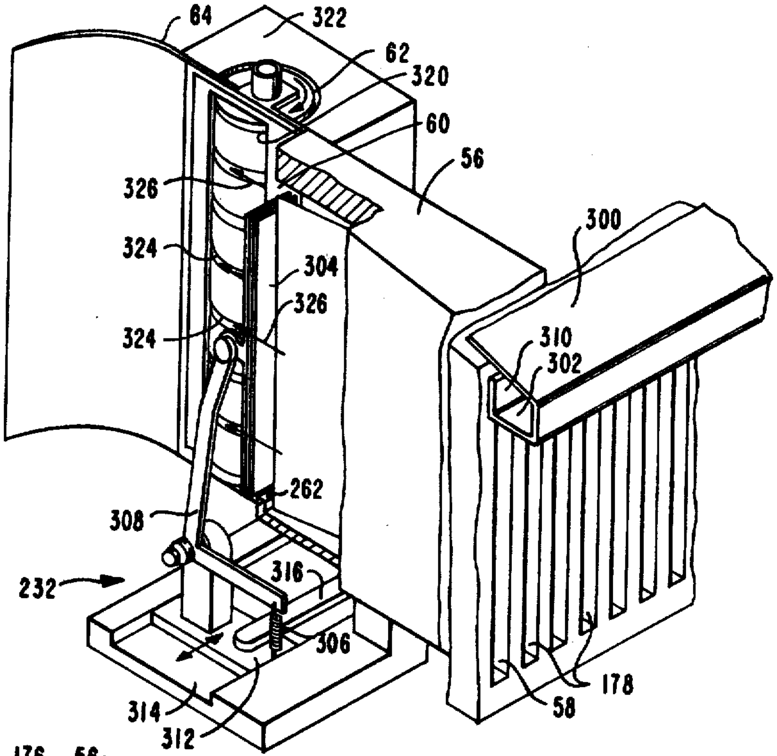
FIG. 11 is a perspective view of a strip stop and positioning mechanism used in the arrangement of FIG. 10.

One arrangement of a stop and positioning mechanism 232, which may be used with the strip selection and ejection mechanism 190 of FIG. 10, is shown in detail in FIG. 11. An index spring 300 extends across the upper portion of the cell chamber entry ends 58 of the storage cell 56 and has a flexible portion 302 which is flexed upwardly by the leading and top edges 238 and 252 of a strip entering one of the cell chambers 178. The flexible portion 302 rides along the top edge 252 of the strip until the strip is completely within the chamber 178, at which point the flexible portion springs downwardly to its normal position. As the entering strip continues to move through the storage chamber 178, the leading edge 238 strikes a stop bar 304. The impact causes the stop bar 304 to move forward against the restraint of a coil spring 306 which is coupled to the end of a pivotably mounted lever arm 308 opposite the end upon which the stop bar is pivotably mounted. When the entering strip has been decelerated to a complete stop by the stop bar 304, the stop bar moves toward the exit end 60 under the urging of the spring 306 to drive the strip in a backward direction and into registration with an upwardly extending edge 310 of the index spring portion 302. The associated selecting fingers then raise the strip to its elevated position in the manner described in connection with FIG. 10, and the upwardly extending lip 262 and stop bar 304 hold the various strips within the storage cell 56.

The lever arm 308 is pivotably mounted on a slide assembly 312 which resides within a slot 314 for sliding movement therealong between a position adjacent the exit end 60 of the storage cell 56 and a position away from the exit end. The stop bar 304 is normally positioned over the exit ends 60 of the storage chambers within the cell 56 by a positioning arm 316 coupled to the slide assembly 312. When a strip is to be ejected from the storage cell 56 for processing, a solenoid (not shown) which is coupled to the positioning arm 316 is energized to move the slide assembly 312 and position the stop bar 304 away from the exit ends 60. One or more strips may then be ejected from the cell 56 unimpeded by the stop bar 304. As soon as the strip or strips have been ejected, the solenoid is de-actuated, moving the slide assembly 312 to its normal position to position the stop bar 304 over the exit end 60 of the cell 56.

As strips are ejected from the storage cell 56, they contact the accelerating capstan 62 and are accelerated to a speed approximately equal to that of the continuous transport as they are driven along the exit guide 64 and onto the entry path portion of the transport. The capstan 62 extends through an elongated slot 320 in the exit guide 64 in order to make contact with ejected strips. Although a capstan 62 having a relatively smooth outer surface is generally satisfactory for some applications, it has been found that best results are achieved if some means are provided for holding ejected strips in positive contact with the capstan. One arrangement for providing such contact is illustrated in FIG. 11 and includes a vacuum manifold 322 through which a source of reduced pressure communicates with a plurality of circumferential grooves 324 in the outer surface of the capstan 62. The vacuum within the manifold 322 causes a flow of air into the grooves 324 and into the manifold as shown by arrows 326 in FIG. 11. As a result, ejected strips are drawn into engagement with the capstan 62 regardless of the particular cell storage chamber 178 from which they are ejected.

Figure 12:
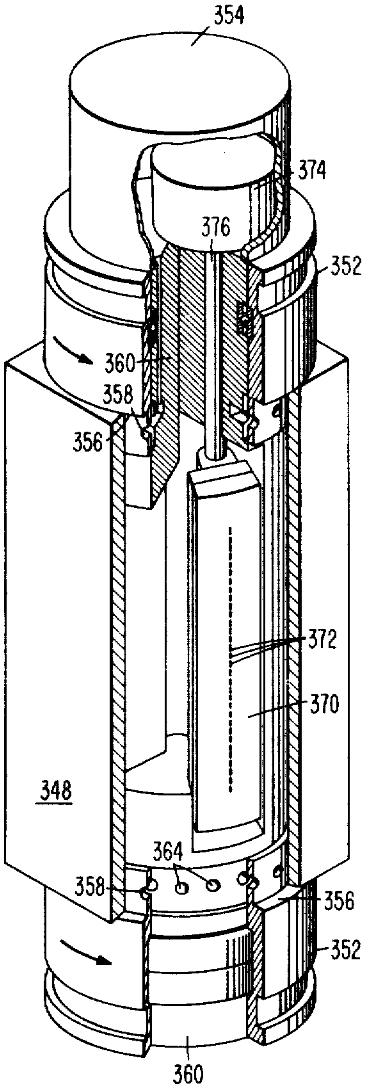
FIG. 12 is a perspective view partly broken away of a read-write processing station which may be used in the arrangements of FIGS. 2 and 4.
Figure 13:
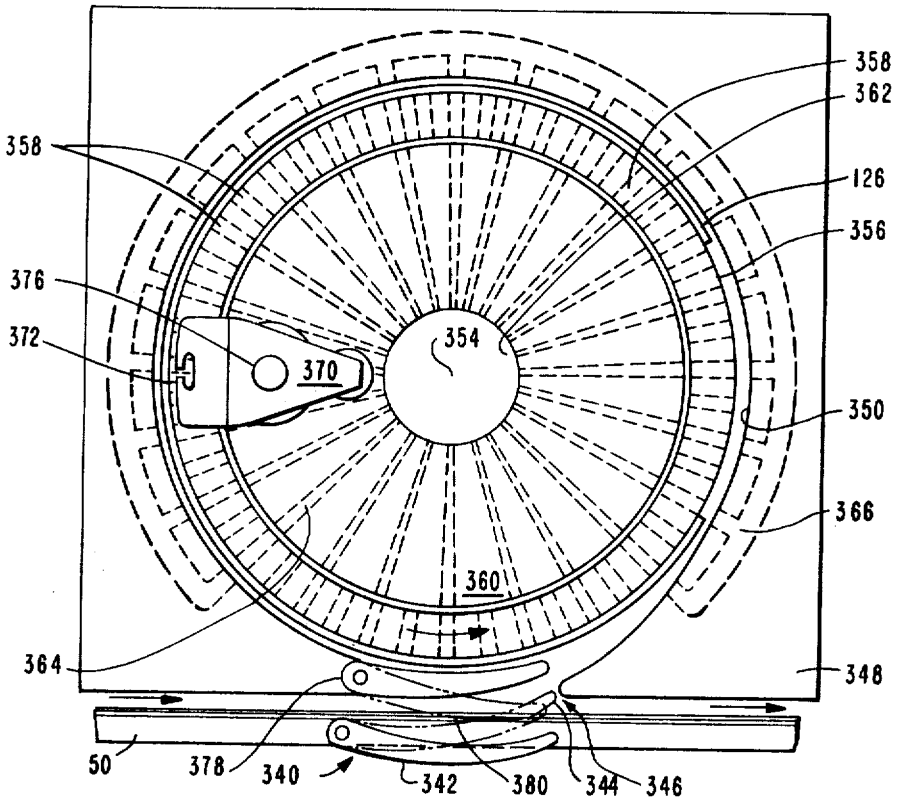
FIG. 13 is a sectional view of the arrangement of FIG. 12 together with an entrance-exit gate and a portion of the continuous transport.

Strips in the entry path portion 52 of the continuous transport are carried to a selected read-write processing station by actuation of an appropriate movable cornering guide 70, if the parallel station path arrangement of FIG. 3 is used, or into an extended portion 94 of the transport if the serial arrangement of FIG. 4 is used. The details of a typical processing station are illustrated in FIGS. 12 and 13, FIG. 12 being a partly broken away view of the major internal components of the station and FIG. 13 being a sectional view from above the major components of the station and including an entrance-exit gate 340. The gate 340 includes an entrance vane 342 normally assuming a position as shown in solid outline in FIG. 13, but actuable to move into a second position shown by the dotted outline 344. When the entrance vane 342 is in the second position 344, strips travelling along the adjacent portion of the transport 50 are directed through an elongated slot 346 in the side of the station housing 348 and into a generally cylindrical cavity 350 therein. As the strip enters the cavity 350, it is drawn into contact with a pair of vacuum rings 352 which are rotatably driven via drive belts (not shown) at a selected speed. The central axes of the vacuum rings 352 coincide with a central axis 354 of the station, and the rings 352 are axially displaced relative to the axis 354. The opposite edges of the strip reside against registration flanges 356 within the rings 352 and are held against the rings by a source of reduced pressure which communicates with the rings via a plurality of apertures 358 extending inwardly from the outer surface of the rings and through the thickness thereof. Concentrically disposed within each of the vacuum rings 352 is a cylindrically shaped vacuum block 360 having a central bore 362 coupled to a vacuum pump (not shown) and a plurality of conduits 364 which extend between the bore 362 and the outer cylindrical surface of the vacuum block 360. Although the vacuum block 360 remains stationary while the vacuum ring 352 rotates, there is sufficient communication between the ring apertures 358 and the block conduits 364 to cause attraction and registration of the strip against the ring 352 and flange 356. Such registration and attraction are further enhanced by a conduit system 366 within the station housing 348 which is coupled to a source of pressurized air (not shown) and which directs air under pressure into the housing cavity 350 and against the rotating strip.

An elongated head bar 370 is mounted within the station cavity 350 and inside the rotating vacuum rings 352 and strip carried thereby to read information from the strip and write information thereon as desired. The longitudinal axis of the head bar 370 is generally parallel to the station central axis 354, and the head bar 370 is movable along its longitudinal axis to position a desired one of a plurality of magnetic heads 372 located along the length thereof adjacent a desired one of a plurality of data tracks on the magnetic strip 126. Movement of the head bar 370 along its longitudinal axis is effected by a voice coil motor 374 coupled to the head bar 370 by an appropriate linkage 376.

When processing of the strip 126 within the station is completed, the strip is directed out of the station and into the transport 50 by an exit vane 378 within the entrance-exit gate 340. The exit vane 378 normally assumes the position shown in solid outline in FIG. 3 and is moved into an alternate position shown by the dotted outline 380 when a strip within the station is to be returned to the transport 50. At the same time that the exit vane 378 is moved into its alternate position 380, the vacuum pump which holds the strip to the registration flanges 356 of the vacuum rings 352 is turned off, allowing centrifugal force to peel the leading edge of the strip off of the vacuum rings. The strip is guided along the exit vane 378 and onto the transport 50 where it is carried to the return path portion 54 of the transport for storage in a desired storage cell 56.

Figure 14:
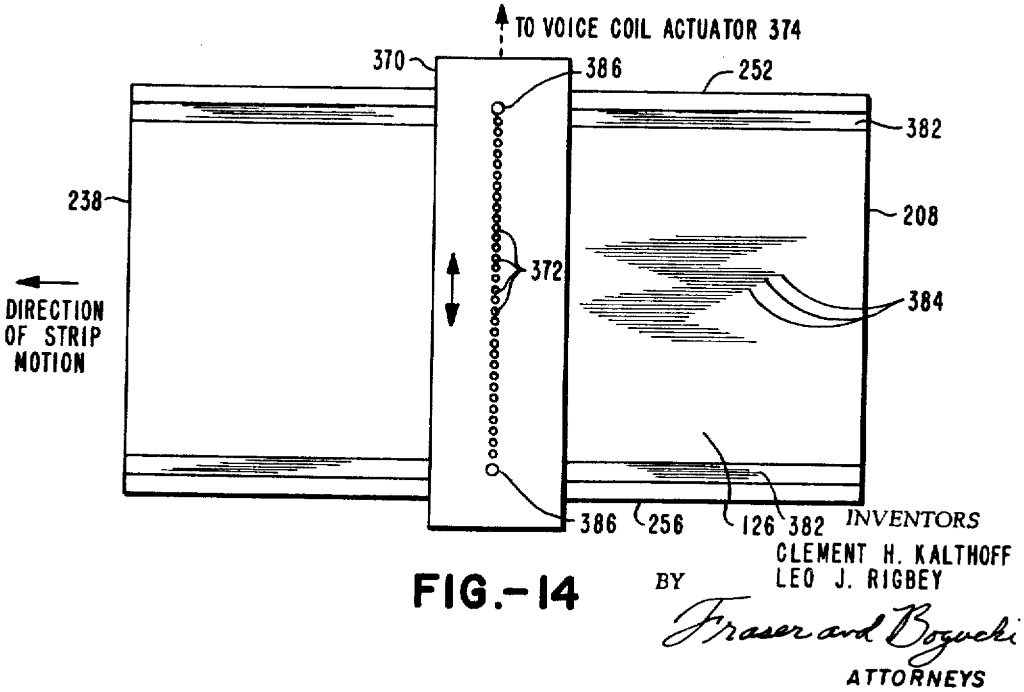
FIG. 14 is a plan view showing the details of a typical magnetic strip and the relative positioning of a processing station head bar.
Figure 15:
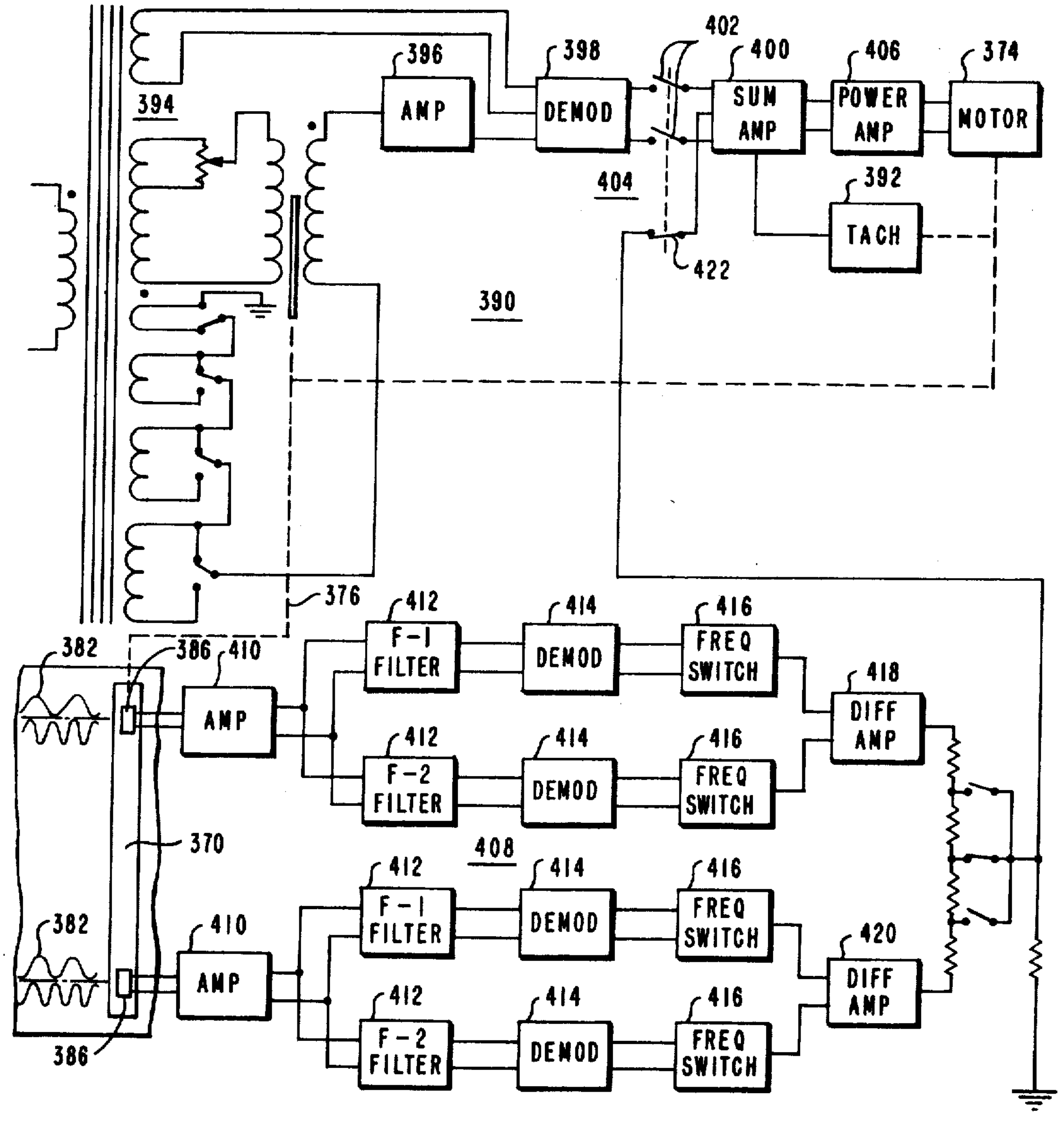
FIG. 15 is a partial schematic and partial block diagram of a servo system for positioning the processing station head bar.

The manner in which the elongated head bar 370 is positioned relative to a circulating strip within the read-write processing station to read or write information may be understood with reference to FIGS. 14 and 15, FIG. 14 showing the lay-out of a typical strip and the movement thereof relative to the head bar and FIG. 15 showing an arrangement of a servo system which may be used to position the head bar. As best shown in FIG. 14, a typical magnetic strip 126 comprises a relatively thin, generally planar rectangular member of flexible material such as Mylar having an oxide coating on one surface thereof to form the recording surface of the strip. Located adjacent and substantially parallel to the top and bottom edges 252 and 256 of the strip are opposite sets of servo tracks 382, it being assumed that each servo track set 382 has sixteen separate magnetic tracks for purposes of illustration. Located between and generally parallel to the servo tracks 382 are a plurality of data tracks 384 which commence a fixed distance from the leading edge 238 of the strip and terminate a fixed distance from the trailing edge 208 of the strip. In the preferred embodiment, a typical strip measures approximately 12 inches in length by approximately 6 inches in width. A servo head 386 at each end of the head bar 370 is caused to track a selected one of the servo tracks in each of the track sets 382 by the servo system shown in FIG. 15 to position a selected one of the heads 372 on one of the data tracks 384. By locating a total of 32 heads 372 along the length of the head bar 370, any one of 512 different data tracks 384 may be read from or written upon. This is so, since each one of the heads 372 handles 16 different data tracks via the 16 track servo sets 382, and the 32 heads 372 can therefore cover all 512 data tracks 384.

The head bar 370 is initially positioned relative to the magnetic strip 126 by a coarse servo 390 which includes a tachometer 392 to provide velocity feedback and a linear variable differential transformer 394 to provide position feedback to the voice coil motor 374. The position signals provided by the transformer 394, one of which is amplified by an amplifier 396, are converted to DC signals by a demodulator 398 and passed to a summing amplifier 400 via the closed contacts 402 of a switch 404. The summing amplifier 400 provides the algebraic sum of the position signal from the transformer 394 and the velocity feedback signal from the tachometer 392, the resultant signal being amplified by an amplifier 406 and passed to the voice coil motor 374 to position the head bar 370 via the mechanical linkage 376.

When the head bar 370 has been positioned in the general vicinity of the desired ones of the servo tracks 382 by the coarse servo 390, a fine servo 408 is employed to provide more accurate tracking for purposes of reading and writing. Due to factors such as temperature expansion and contraction of the strip 126, it is possible for one of the servo heads 386 to track directly on a particular servo track in the one set 382 while the other servo head 386 tracks slightly off a corresponding servo track within the other servo track set 382. For this reason, it may be advantageous for some applications to provide a servo system which causes the servo heads to track between adjacent servo tracks rather than on a particular track. Such an arrangement is shown by the fine servo 408 in FIG. 15.

As shown in FIG. 15, the adjacent pairs of servo tracks comprise signals of different frequency. Each of the servo heads 386 senses a mixture of the two different frequencies and amplifies such mixture in an amplifier 410. The amplified signals of two different frequencies are then separated by filters 412, converted into equivalent DC signals by demodulators 414 and selectively applied by frequency switches 416 to the separate inputs of a differential amplifier 418. The output signal from the differential amplifier 418 represents the position of the associated servo head 386 relative to the two different adjacent servo tracks 382. A second differential amplifier 420 performs the same function for the other one of the servo heads 386. The sum of the outputs from the amplifiers 418 and 420 provides a position error signal which is summed with the velocity signal from the tachometer 392 in the summing amplifier 400. The fine servo 408 is coupled to the summing amplifier 400 in place of the coarse servo 390 by throwing the switch 404 to open the contacts 402 and close a third contact 422.

During each revolution of the strip 126 within the processing station, compliance between the strip and the head bar 370 is lost as the trailing edge 208 of the strip crosses the head bar. No servo signal is available to the system until the leading edge 238 of the strip again passes over the head bar. The lateral misalignment between the trailing edge 208 and the leading edge 238 of the strip may amount to as much as 0.004 inch. By using a voice coil motor 374 of sufficient power, and by operating the motor in a bang-bang mode, the head bar can be moved 0.004 inches in 2.9 milliseconds including settling time. As shown in FIG. 14, a lateral space of approximately 2.5 inches is provided between the leading edge 238 of the strip and the start of the data tracks 384 to allow the fine servo 408 to begin tracking again before the data tracks pass under the head bar.

When a particular one of the magnetic heads 372 is positioned over a desired one of the data tracks 384 in the manner described above, a desired portion of the track 384 is selected for reading or writing by an address signal which precedes the desired portion on the track and is pre-recorded thereon. When the address signal corresponding to the desired portion is sensed by the head 372, the appropriate information is read from or recorded on the portion.

Figure 18:
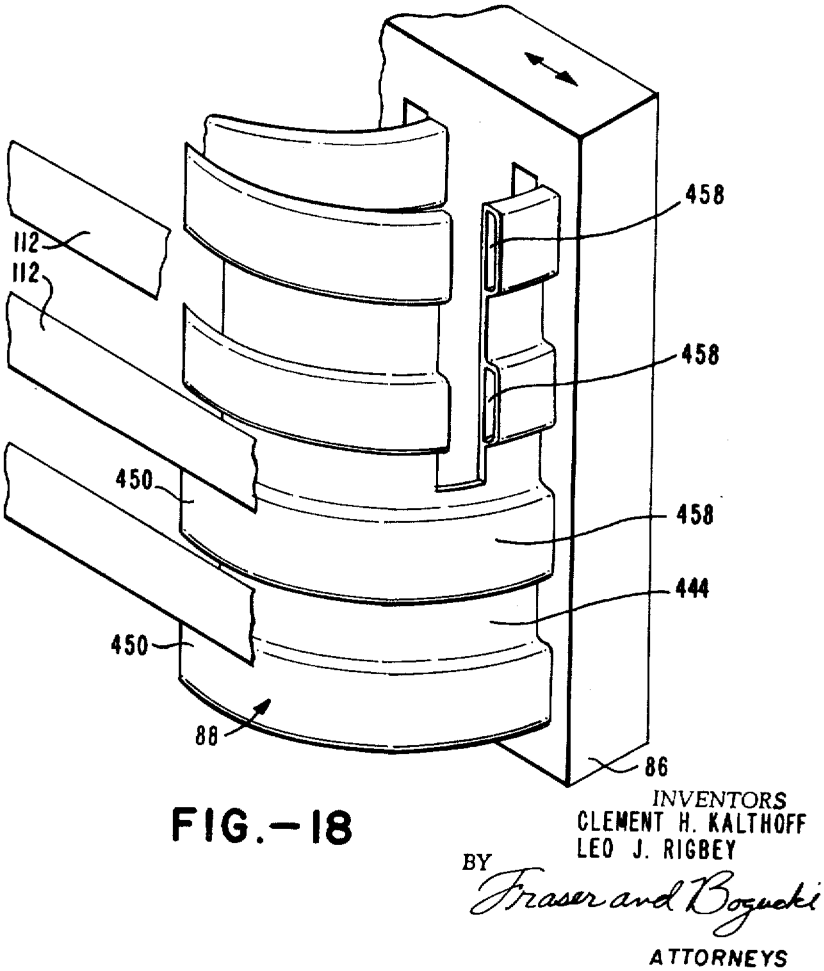
FIG. 18 is a perspective view of a portion of the arrangement of FIG. 16 illustrating the details of the return guides.
Figure 16:
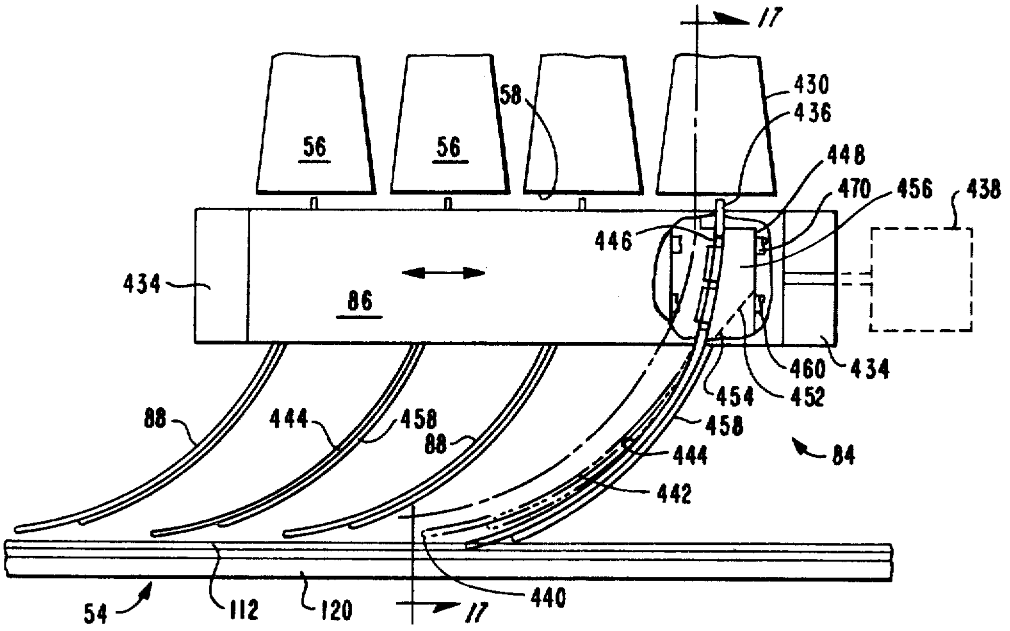
FIG. 16 is a plan view of a strip restoring mechanism used in the system of FIG. 2.
Figure 17:
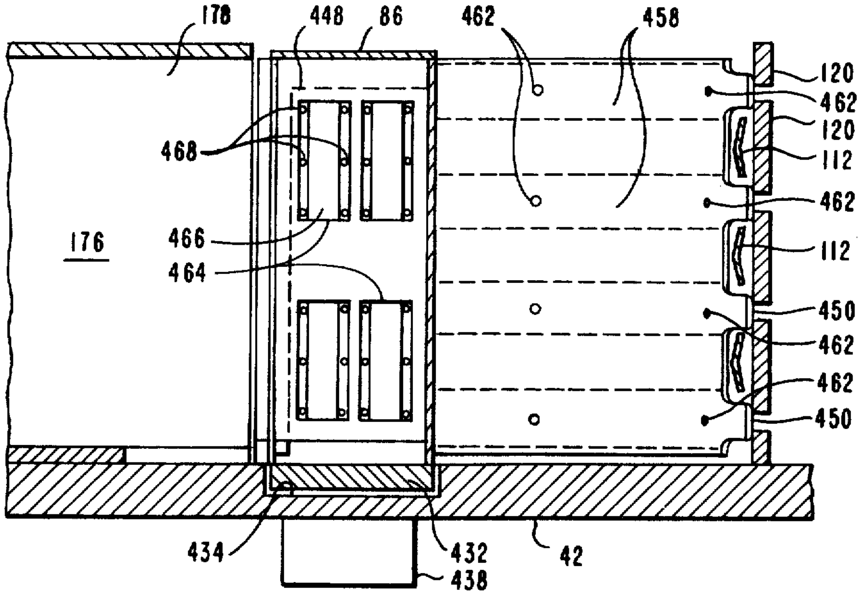
FIG. 17 is a sectional view of the arrangement of FIG. 16 taken along the line 17–17' thereof.

The details of a typical one of the strip restoring mechanisms 84 for directing strips in the return path portion 54 of the transport into selected ones of the storage cells 56 and the chambers 178 therein are illustrated in FIGS. 16, 17 and 18. The mechanism 84 is illustrated as including four return guides 88 for directing strips into selected ones of the chambers within four different storage cells 56, although in actual practice the mechanism can employ any desired number of the guides 88. For purposes of illustration, it is assumed that the fourth storage cell 430 (shown in FIG. 16) is the cell into which a strip in the return path portion 54 of the transport is to be directed. The housing 86 is mounted on a movable slide 432 which resides within a mating slot 434 in the main base plate 42 for lateral movement of the housing relative to the entry ends 58 of the cells 56. One end 436 of the return guide 88 associated with the cell 430 is aligned with a particular chamber 178 in the cell 430 into which the returning strip is to be directed by an incrementing mechanism 438 coupled to the movable slide 432. If each of the storage cells 56 has 16 different ones of the chambers 178, then the mechanism 438 must be capable of laterally moving the housing 86 to any one of 16 different positions. Mechanisms capable of such operations are known in the art. One such mechanism is shown in copending U.S. patent application Ser. No. 666,212, filed Sept. 7, 1967 by H. A. Khoury and assigned to the assignee hereof. The end 440 of the return guide 88 opposite the one end 436 is normally held in a position adjacent but spaced apart from the endless belts 112 and supports 120 of the return path portion 54 as shown by the dotted outline 442 and by the three remaining guides 88 to the left thereof in FIG. 16. When in this position, strips in the transport are free to pass by the guides 88 without interference.

Each of the return guides 88 includes a relatively thin, flexible metal leaf 44 of generally arcuate form which is curved along the length thereof between the opposite ends 436 and 440. That portion of each leaf 44 within the housing 86 is rigidly mounted on the slightly concave surface 446 of an anchor block 448 within the housing. The end 440 of the leaf 444 adjacent the transport includes a plurality of extension fingers 450 which extend outwardly from the remaining portion of the leaf and which extend between the endless belts 112 and into engagement with the supports 120 when the return guide 88 is actuated to scoop off a strip from the transport. The anchor block 448 has a hollow interior which is divided by a partition 452 into a pressure manifold 454 and a vacuum manifold 456. A plurality of Bourdon type tubes 458 are generally coextensive with each of the leaves 44 along a portion of the length thereof between the housing 86 and the end 440 adjacent the transport. The tubes 458 are generally enclosed chambers which communicate with the pressure manifold 454 in the anchor block 448.

The pressure within the tubes 458 is normally kept at a first level substantially equal to outside atmospheric pressure. The tubes 458 which are mounted on the convex surface of the leaves 444 have no effect on the curvature of the leaves when at the first pressure level, and the ends 440 of the leaves adjacent the transport remain spaced apart from the transport. A selected one of the guides 88 is actuated to scoop off a strip in the return path portion 54 by establishing an increased pressure within the manifold 454 of the anchor block 448 via a connecting hose 460. The pressure within the tubes 458 is thereby increased to a second level, causing the tubes to tend to straighten out to a degree determined by the pressure level. The supporting leaf 444 is reduced in curvature, moving the extension fingers 450 thereof between the transport belts 112 and into contact with the belt supports 120 as shown in FIGS. 16 and 17. A strip in the return path portion 54 of the transport is scooped off of the transport belts 112 by the actuated guide 88 and directed along the concave surface of the guide leaf 444 toward the housing 86. In order to minimize the physical contact between the strip and the leaf 444 and to facilitate ease of movement of the strip therealong, a plurality of apertures 462 are provided between the inside of each tube 458 and the concave surface of the associated leaf 444. Air within the tubes 458 which is under increased pressure escapes through the apertures 462 to provide a lubricating air film for the entering strip.

It is also recognized that curvature of the arcuate leaf may be increased by reducing the pressure within the tubes 458. Thus, alternative arrangements of the strip restoring mechanism 84 include those in which the natural curvature of the leaves 444 is such as to position the extension fingers 450 between the transport belts 112 and in contact with the belt supports 120 whenever atmospheric pressure exists within the tubes 458. In such arrangements the ends 440 of the leaves are held spaced apart from the transport by reducing the pressure within the tubes 458 to increase the curvature of the leaves 444.

In most instances, it is desirable to reduce the speed of the strip prior to its entry into a selected one of the cell chambers 178. Deceleration of the strip is therefore provided by vacuum braking mechanisms 464 within the housing 86. Each of the braking mechanisms 464 includes a pad 466 of material having a relatively high coefficient of friction and mounted on the concave surface of the leaf 444 within the housing 86. Adjacent opposite edges of the pad 466 are a plurality of apertures 468 which extend from the concave surface of the leaf 444 into the vacuum manifold 456 within the anchor block 448. By connecting a hose 470 from the vacuum manifold 456 to a source of reduced pressure such as a vacuum pump, a condition of reduced pressure is established within the manifold 456. The reduced pressure within the manifold communicates with the concave surface of the leaf 444 via the apertures 468 to draw the entering strip into contact with the highly frictional pads 466, thereby reducing the speed of the strip. The amount of deceleration which may be imparted to the strip is dependent in part upon the coefficient of friction of the pads 466, the surface area of the pads, the size of the apertures 468 and the level of reduced pressure within the manifold 456.

The decelerated strip enters the selected cell chamber 178 and is brought to rest by an appropriate arrangement such as the stop and positioning mechanism 232 shown in FIG. 11. The vacuum hook-up to the manifold 456 may then be disconnected or shut down to de-activate the braking mechanisms 464. The pressure within the tubes 458 is reduced to the first level to relax the tubes. As the tubes relax, their curvature increases, moving the end 440 of the guide to a position spaced apart from the transport and the extension fingers 450 away from their position against the belt supports 120. The solenoid 438 is then actuated to position a selected one of the guides 88 at a storage chamber 178 within an associated one of the cells 56 in preparation for the next strip in the return path portion 54 which is to be stored.

Figure 19:
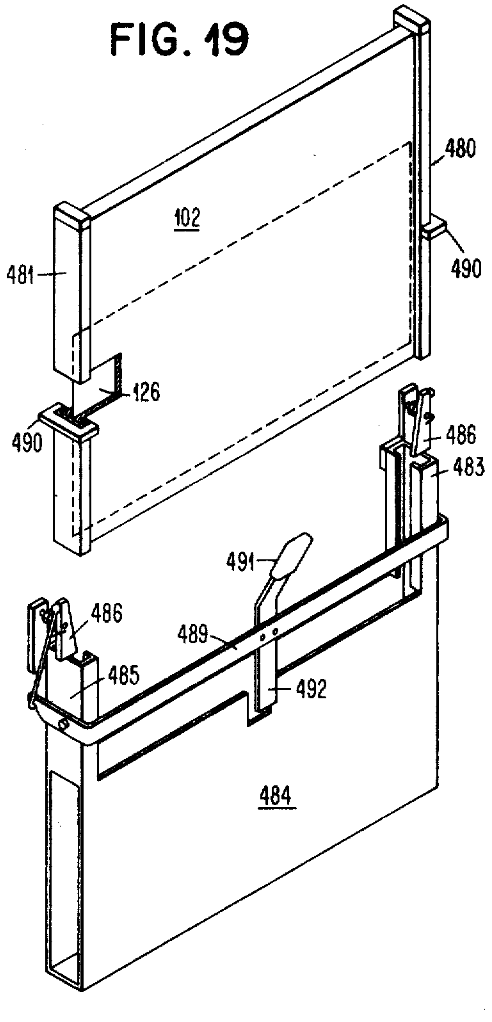
FIG. 19 is a perspective view of a single strip insertion and removal station in accordance with the invention.

As previously discussed in connection with FIGS. 2 and 3, single strips may be removed from or added to the storage system by the single strip insertion and removal station 100. The details of the station 100 are shown in FIG. 19. The stiff walled envelope 102 comprises a relatively thin, generally rectangular member having a hollow interior configured to contain a single strip 126, and slidable end covers 480, 481 which are normally positioned over the opposite open ends of the member as shown to provide a dust tight seal for the strip stored therein. The envelope 102 and end covers 480, 481 are preferably fabricated of a suitable material such as polyvinyl chloride or acrylonitrile-butadiene-styrene.

The envelope 102 is positioned within a receptacle 484 in the storage system to add or remove a strip from the system by inserting the slidable end covers 480 and 481 within cover guides 483 and 485 at the opposite ends of the receptacle and sliding the envelope 102 in a downward direction. The entrance covers 480, 481 and corresponding guides 483, 485 are of different size to insure proper orientation of the envelope 102. The end covers 480 and 481 slide within the cover guides 484 and 485 in response to the downward movement of the envelope 102 until stops 490 which are mounted on the covers engage the upper ends of the guides. The stops 490 are held in place against the upper ends of the cover guides 483 and 485 by latches 486 pivotably mounted on the guides. The end covers 480 and 481 slide relative to the envelope 102 in response to further downward movement of the envelope to open the opposite ends thereof. Suitable detection means such as a pressure sensitive switch at the bottom of the receptacle 484 determine when the envelope 102 is in its fully loaded position.

With the envelope 102 in its fully loaded position within the receptacle 484, a strip 126 which is stored therein may be driven out of the envelope by any appropriate means such as the hammer and cam follower arrangement shown in FIGS. 8 and 9. The ejected strip is accelerated and guided onto the entry path portion 62 of the transport by an arrangement such as that shown in FIG. 11 and associated with the station 100.

A strip in the return path portion 54 of the transport may be directed into the empty envelope 102 for removal from the storage system by actuation of a return guide 88 associated with the station 100. The entering strip is stopped and indexed within the envelope 102 by an appropriate arrangement such as the movable stop and associated indexing spring shown in FIG. 11.

Removal of the envelope 102 from the receptacle 484 is commenced by pulling the envelope in an upward direction. The stops 490 are held in position against the upper ends of the cover guides 483 and 485 by the latches 486 resulting in the sliding of the covers 480 and 481 relative to the envelope 102 to close the opposite open ends thereof. Pivoting movement of a receptacle mounted latch trip mechanism 489 under the control of an associated actuating handle 491 removes the latches 486 from their position over the stops 490 permitting complete removal of the envelope 102. Complete closure of the covers 480, 481 over the ends of the envelope prior to removal is insured by an extension 492 of the handle 491 which cams against the envelope to prevent removal of the latches 486 unless the envelope is in a completely raised position.

It will be appreciated from the above discussion that storage systems in accordance with the invention provide numerous features and advantages not realizable with conventional storage systems. The selective movement of strips between various points in the continuous transport eliminates the need for bulky and complex mechanical apparatus such as is required in those conventional systems which move the entire storage unit or a portion thereof to the vicinity of the processing station. The rapidly moving continuous transport which typically operates at speeds of 750 inches per second or greater conveys the strips to various points in the transport in a minimum amount of time. In one particularly large arrangement of a storage system constructed and operated in accordance with the invention, a sufficient number of storage cells are included to provide a storage capability of approximately 4 billion bytes of information within the system, yet the maximum amount of time required to convey the strips along the entry path portion of the transport to a selected processing station is on the order of 230 milliseconds. The strips are accessed for processing without the need for physical identification media such as identification tabs, and the strips themselves are subjected to a minimum of wear and abuse, since there is a minimum of physical contact between the strips and the various parts of the storage system. The use of a plurality of processing stations in parallel or serial arrangements enables the simultaneous processing of a plurality of strips, and each strip may be circulated within an individual processing station as many times as are necessary to effect a desired read-write operation. Individual strips can be removed from or added to the transport system while the system is in operation by means of the single strip insertion and removal station.

While the invention has been particularly shown and described with reference to preferred embodiments thereof, it will be understood by those skilled in the art that various changes in form and details may be made therein without departing from the spirit and scope of the invention.

What is claimed is:

1. A random access storage system comprising a continuously driven record member transport having spaced apart entry and return paths, means disposed between the entry and return paths for storing at least one record member, at least one record member processing station disposed between the entry and return paths, means for identifying individual ones of the record members by their position within the storing means, means for moving individual record members at random from the storing means into the entry path for movement therealong in a direction toward the record member processing station, means for directing a record member from the entry path into the processing station, and means for directing record members from the processing station into the return path.

2. A random access storage system in accordance with claim 1, further including an envelope having a hollow interior configured to contain a single record member and having opposite entry and exit ends which may be selectively opened and closed, means disposed between said entry and return paths for receiving said envelope, means for ejecting a record member contained within the envelope into the entry path when the envelope is received within the receiving means, and means for selectively directing a record member in the return path into the envelope.

3. A random access storage system in accordance with claim 1, further including means for directing record members in the return path into the particular positions within the storing means in which the record members were stored prior to their being moved into the entry path.

4. A random access storage system in accordance with claim 3, wherein the means for directing record members in the return path into the particular positions within the storing means comprises at least one flexible curved guide having one end which is positionable adjacent a selected one of the particular positions within the storing means and an opposite end positioned adjacent the return path, means defining at least one generally enclosed pressure chamber which is substantially coextensive with and extends along a portion of the guide between said one end and said opposite end, and means for selectively varying the pressure within the pressure chamber.

5. A random access storage system in accordance with claim 3, further including a plurality of record member processing stations and means for directing a record member from the entry path into a selected one of the processing stations, said means comprising movable cornering guides disposed between the entry path and all but one of said plurality of record member processing stations.

6. A random access storage system in accordance with claim 5, wherein the continuously driven record member transport comprises a plurality of generally cylindrical members mounted for rotation about their central axes, a separate plurality of endless belts extending around and between adjacent pairs of the generally cylindrical members, and means for rotatably driving at least some of the cylindrical members, and wherein each of said movable cornering guides comprises a pair of generally cylindrical members mounted for rotation about their central axes, a plurality of endless belts extending around and between said pair of generally cylindrical members, and means for selectively moving one of said pair of generally cylindrical members to either of two different positions which are substantially equidistantly spaced from the other of said pair of generally cylindrical members.

7. A random access storage system comprising a continuously driven strip transport having entry and return path portions, each of said portions including at least one elongated element continuously moving along a defined path and means providing a reduced pressure relative to ambient in the region of said elongated element, a cell disposed between said entry and return path portions of the strip transport, said cell having a plurality of chambers for storing different ones of a plurality of magnetic strips, a strip processing station disposed between said entry and return path portions of the strip transport, means for moving individual strips at random from the cell into the entry path portion of the strip transport, said strips being attracted to the at least one elongated element of the entry and return path portions by the reduced pressure for transport along the entry path portion to the processing station and from the processing station along the return path portion, and means for directing strips in the return path portion into selected ones of the cell chambers.

8. A random access storage system in accordance with claim 7, wherein the continuously driven strip transport comprises a plurality of rotatable elements spaced apart from one another, means for rotating at least some of the rotatable elements at a selected speed, a separate plurality of endless belts disposed about each adjacent pair of the rotatable elements, each plurality of belts being maintained in generally parallel spaced apart relation by the associated rotatable elements for movement therewith, the outer surfaces of the belts on one side of the associated rotatable elements defining a portion of a transport path, a plurality of elongated supporting elements, said supporting elements being mounted adjacent the sides of the belts opposite said outer surfaces and in generally parallel spaced apart relation to one another, and means for providing a reduced pressure at the opposite sides of the support elements from the belts, and reduced pressure creating an air flow between the belts and supporting elements whereby strips are drawn into contact with the outer surfaces of the belts for movement therewith along the portion of the transport path defined thereby.

9. In a random access storage system wherein randomly selected ones of a plurality of sheet-lke record members are successively transported by the continuous transport from individual chambers within at least one storage cell to a processing station and to a return path portion thereof, means for directing record members in the return path portion into selected ones of the cell chambers comprising at least one flexible curved guide having one end which is positionable at a selected one of the cell chambers and an opposite end positioned adjacent the return path portion of the continuous transport, means defining at least one generally enclosed pressure chamber which is substantially coextensive with and extends along a portion of the guide between said one end and said opposite end, and means communicating with said at least one pressure chamber for selectively providing either of two different pressure levels therein, one of the two different pressure levels reducing the curvature of the guide to position said opposite end thereof within the return path portion, and the other of the two different pressure levels increasing the curvature of the guide to position said opposite end thereof outside of the return path portion.

10. The combination defined in claim 9, wherein said return path portion of the continuous transport comprises a plurality of elongated elements which are mounted in generally parallel, spaced apart relation for movement in the direction of elongation thereof, wherein said opposite end of the curved guide includes a plurality of spaced apart fingers extending outwardly therefrom, said fingers extending between the elongated elements of the return path portion whenever said opposite end of the curved guide is positioned within the return path portion, and wherein said pressure chamber is provided by a hollow tube which is integral with and extends along a substantial portion of the curved guide.

11. The combination defined in claim 10, further including means associated with the hollow tube for releasing a portion of pressure therein in an outward direction from a surface of the curved guide to provide air film lubrication for record members.

12. The combination defined in claim 11, wherein the curved guide has at least one aperture extending from said surface through the thickness thereof, and a portion of said surface of the curved guide adjacent said at least one aperture has a relatively high coefficient of friction, and further including means communicating with said at least one aperture for selectively providing a reduced pressure relative to ambient within the aperture, the reduced pressure drawing a record member which travels along said surface of the curved guide into contact with the portion of such surface having a relatively high coefficient of friction to reduce the speed of the record member.

13. In a random access storage system wherein randomly selected ones of a plurality of sheet-like record members are successively transported by a continuous transport from an entry portion thereof to a processing station and to a return portion thereof, the combination comprising at least one storage cell disposed between the entry and return portions of the continuous transport, said cell including a housing having an open entry end adjacent the return portion of the transport and an open exit end adjacent the entry portion of the transport, a plurality of separator elements mounted within the housing in spaced-apart relation and extending from the entry end of the housing along a portion of the length of the housing to define a plurality of storage chambers, each of which is capable of receiving and storing one of the sheet-like record members, ejecting means associated with each of the storage chambers and including means movable into contact with a record member stored therein to drive the record member out of the chamber, and means for stopping the movement of record members which are directed into the cell chambers from the return portion of the continuous transport for storage.

14. The combination defined in claim 13, further comprising means located adjacent the entry end of the cell for decelerating a record member which is directed from the return portion of the continuous transport into the cell for storage, a generally cylindrical capstan rotatably mounted adjacent the exit end of the cell, and means for rotatably driving the capstan at a selected speed to accelerate a record member which is driven out of the cell.

15. The combination defined in claim 13, wherein the cell housing converges from a maximum width at the entry end thereof to a minimum width at the exit end thereof, and further including means at least partially located within each separator element for directing a flow of gas between adjacent record members stored within the cell.

16. The combination defined in claim 13, wherein the ejecting means includes an elongated bar and means supporting the bar for movement about an axis generally parallel to the longitudinal axis of the bar between a position away from and a position within the entry end of the cell.

17. The combination defined in claim 16, further including means for normally holding record members which are stored in the chambers in an elevated position, and means for overcoming said means for normally holding to lower a selected record member, whereby movement of the elongated bar into said position within the entry end of the cell results in contact of the selected record member by the bar to drive the member out of the cell.

18. The combination defined in claim 17, wherein the means for normally holding and the means for overcoming together comprise a separate pair of movable selecting fingers located within each cell chamber for contacting opposite top and bottom edges of a record member stored therein, separate magnet pole means associated with each pair of the movable selecting fingers for providing magnetic fields for sufficient strength to hold each finger of the associated pair in a first position to hold the associated record member in contact with the fingers in the elevated position, and separate means associated with each of the separate magnet pole means for overcoming the magnetic fields of the magnet pole means to permit the fingers of the associated selecting finger pair to be moved into a second position to lower a record member in contact with the fingers, and wherein the bottom surface of the cell slopes downwardly along a portion of the length thereof to an upwardly extending lip at the exit end thereof.

19. The combination defined in claim 13, wherein each of the sheet-like record members has a notch in one edge thereof, and further including separate means located within each chamber for selective engagement within the notch of a record member directed into the chamber to secure the member for storage therein.

20. The combination defined in claim 19, wherein the ejecting means comprises a separate pivotally mounted hammer element adjacent the entry end of each chamber, means for normally holding each hammer element in a first position away from the entry end of the associated chamber, means for overcoming the normally holding means to advance a selection of one of the hammer elements away from the first position and into contact with a record member stored in the associated chamber, and means responsive to the advance of the selected hammer element into contact with the record member for controlling the movement of the selected hammer element in a direction away from the first position to drive the record member out of the chamber at a predetermined speed.

21. The combination defined in claim 20, wherein the means for normally holding each pivotally mounted hammer element in a first position comprises a magnet having a plurality of pole pieces individually associated with different ones of the hammer elements, wherein the means for overcoming the normally holding means comprises a separate coil wound around each of the plurality of pole pieces, means for energizing a selected one of the coils in response to an external command signal, and separate resilient means coupled to each of the pivotably mounted hammer elements for urging the hammer element away from the first position, and wherein the means for controlling the movement comprises a pivotally mounted cam follower in contact with each of the pivotally mounted hammer elements, a rotatable cam engaging the cam follower, and means responsive to the energization of a selected one of the coils for rotating the associated cam through at least one revolution, rotation of the cam pivoting the engaged cam follower to control movement of the pivotally mounted hammer element which is in contact therewith at a controlled speed.

22. The combination defined in claim 21, wherein said separate locking means comprise a plurality of flexible elements associated with different ones of the storage chambers, each flexible element having a portion thereof adapted for engagement within the notch of a record member directed into the associated chamber and having one end rigidly mounted on a common pivotable member and the opposite end in engagement with an associated hammer element, whereby movement of the hammer element into contact with the record member to drive the member out of the chamber results in flexture of the flexible element in a direction to remove the engaging portion from the record member notch.

23. The combination defined in claim 22, wherein said means for stopping the movement of record members comprises a movable stop element mounted adjacent the exit end of the cell housing, means for moving the stop element into a first position away from the exit end of the cell housing to permit ejection of a record member stored within the cell out of the cell, and means for moving the stop element into a second position over the exit end of the cell housing to stop the forward movement of record members which are directed from the return portion of the transport into the chambers within the cell, and further including means responsive to the means for moving the stop element into its second position for rotating the pivotable member in a direction to remove the engaging portions of the mounted flexible elements from the record member notches, whereby a record member which is didected into one of the chambers may move into contact with the stop element before being locked into position.

24. A random access storage system comprising an enclosed housing having a generally planar base surface on the interior thereof, a plurality of generally cylindrical elements rotatable about their central axes and mounted on the base surface with their central axes substantially normal to the plane of such surface, said cylindrical elements being arranged to define a continuous transport path along the base surface, a plurality of endless belts extending about at least some of the cylindrical elements and the immediately adjacent cylindrical elements on both sides thereof, vacuum means for providing a region of reduced pressure adjacent each of the endless belts, means for rotatively driving at least some of the cylindrical elements, a plurality of storage cells mounted on the base surface between first and second portions of the continuous transport path, each cell having a plurality of individual chambers having entry ends adjacent the first transport path portion and exit ends adjacent the second transport path portion, each of the individual chambers being configured to store a strip record member therein, the strip record members being identified by the particular chambers in which they are stored, a read-write station located adjacent a third portion of the continuous transport path, gating means for selectively directing a strip record member in said third portion of the continuous path into and out of the read-write station, a first plurality of curved guides, each having one end adjacent the entry end of a different one of the storage cells and an opposite end selectively movable between a first position spaced apart from the first portion of the continuous transport path and a second position within said first portion, means for aligning said one end of each curved guide with a selected one of the chambers within the associated storage cell, braking means adjacent the entry end of each storage cell for decreasing the speed of a strip record member which is diverted from the first portion of the continuous transport path into its designated cell chamber, a second plurality of curved guides, each having one end substantially continuous with the exit end of a different one of the storage cells and the opposite end positioned adjacent the second portion of the continuous transport path, accelerating means adjacent the exit end of each storage cell for increasing the speed of a strip record member which is driven out of the cell and into contact therewith, and means for driving individual strip record members at random into the associated accelerating means in response to external command signals which identify strip record members to be processed in accordance with the cell chambers in which they are located, whereby selected ones of the strip members are transported in random succession to the read-write station for processing and back to their cell chambers for storage.

References Cited

UNITED STATES PATENTS

| | | | |
|---|---|---|---|
| 3,238,509 | 3/1966 | Schnoor et al. | 340—172.5 |
| 3,292,878 | 12/1966 | Junge et al. | 221—87 |
| 3,406,382 | 10/1968 | Wilmer | 340—173 |

STANLEY H. TOLLBERG, Primary Examiner

U.S. Cl. X.R.

340—172.5

PO-1050
(5/69)

UNITED STATES PATENT OFFICE
CERTIFICATE OF CORRECTION

Patent No. 3,504,824 Dated April 7, 1970

Inventor(s) Clement H. Kalthoff and Leo J. Rigbey

It is certified that error appears in the above-identified patent and that said Letters Patent are hereby corrected as shown below:

Column 19, lines 35 and 36, after "storing" delete "at least one record member" and insert therefor --a plurality of record members--. Column 20, line 57, before "reduced" delete "and" and insert therefor --said--; line 63, for "sheet-lke" read --sheet-like--; line 64, before "continuous" delete "the" and insert therefor --a--. Column 22, line 26, after "fields" delete "for" and insert therefor --of--; line 50, for "selection of" read --selected--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents